United States Patent [19]
Erskine

[11] Patent Number: 5,910,839
[45] Date of Patent: *Jun. 8, 1999

[54] WHITE LIGHT VELOCITY INTERFEROMETER

[75] Inventor: David J. Erskine, Oakland, Calif.

[73] Assignee: The Regents of the University of California, Oakland, Calif.

[*] Notice: This patent is subject to a terminal disclaimer.

[21] Appl. No.: 08/818,020

[22] Filed: Mar. 14, 1997

Related U.S. Application Data

[63] Continuation of application No. 08/597,082, Feb. 5, 1996, Pat. No. 5,642,194.

[51] Int. Cl.$^6$ ........................................... G01B 9/02
[52] U.S. Cl. ..................... 356/345; 356/28.5; 356/358
[58] Field of Search ................... 356/28.5, 357, 356/432 T, 345, 358; 73/655, 657

[56] References Cited

U.S. PATENT DOCUMENTS

| | | | |
|---|---|---|---|
| 4,915,499 | 4/1990 | Gidon et al. | 356/28.5 |
| 5,642,194 | 6/1997 | Erskine | 356/345 |

OTHER PUBLICATIONS

Gidon et al., Multiple–line laser Doppler velocimetry, Jun. 1, 1988, vol. 27, No. 11, Applied Optics, pp. 2315–2319.

*Primary Examiner*—Robert Kim
*Assistant Examiner*—Amanda Merlino
*Attorney, Agent, or Firm*—John P. Wooldridge

[57] ABSTRACT

The invention is a technique that allows the use of broadband and incoherent illumination. Although denoted white light velocimetry, this principle can be applied to any wave phenomenon. For the first time, powerful, compact or inexpensive sources can be used for remote target velocimetry. These include flash and arc lamps, light from detonations, pulsed lasers, chirped frequency lasers, and lasers operating simultaneously in several wavelengths. The technique is demonstrated with white light from an incandescent source to measure a target moving at 16 m/s.

87 Claims, 14 Drawing Sheets

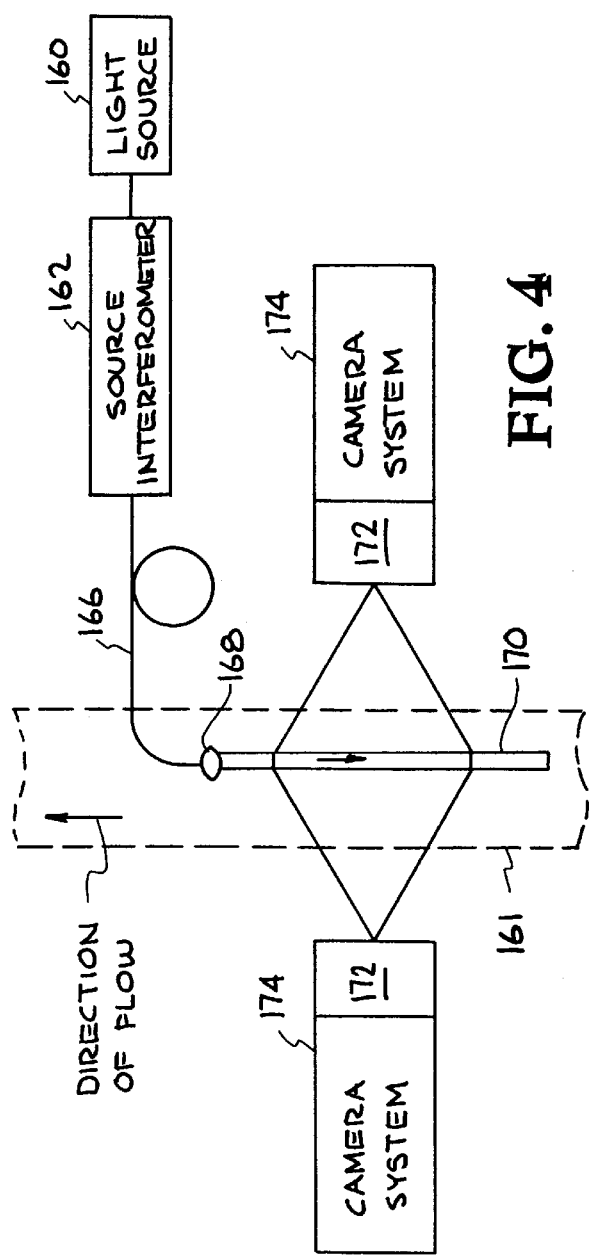
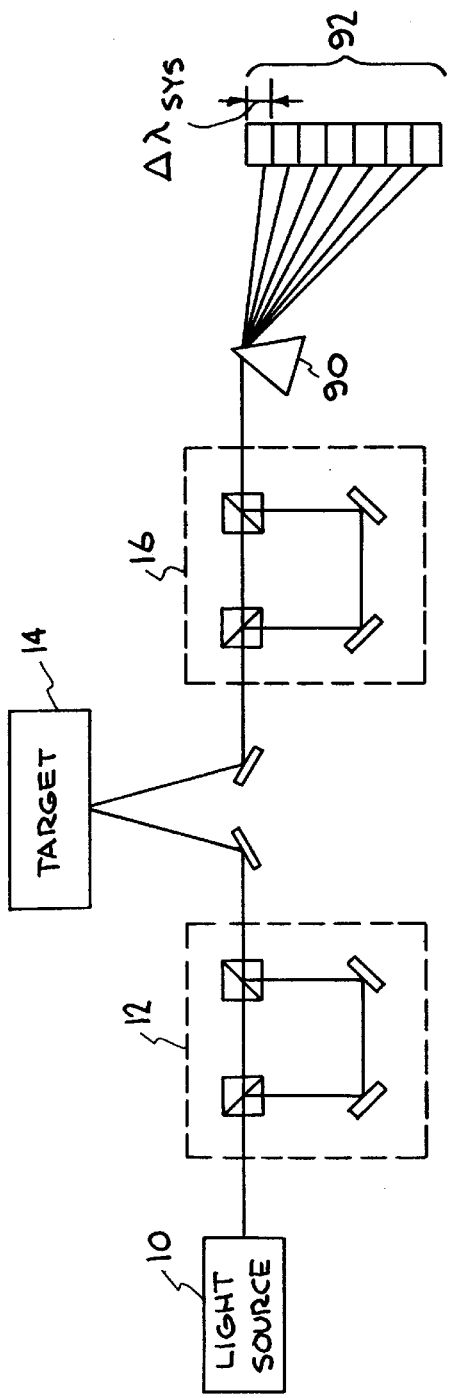
FIG. 4
FIG. 5A

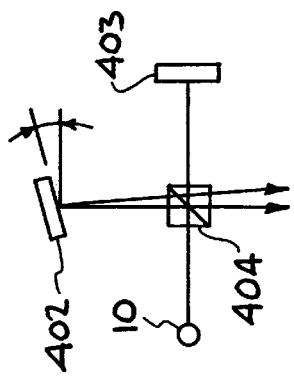
FIG. 7C
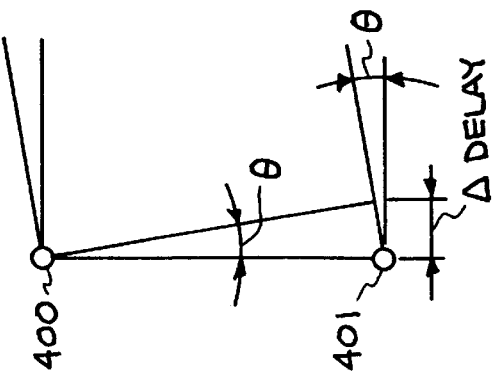
FIG. 7F
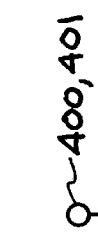
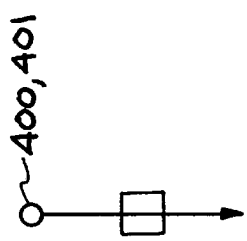
FIG. 7B
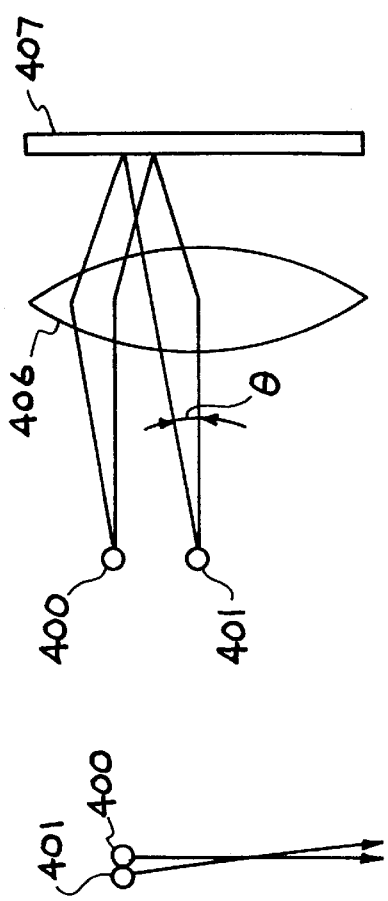
FIG. 7E
FIG. 7A
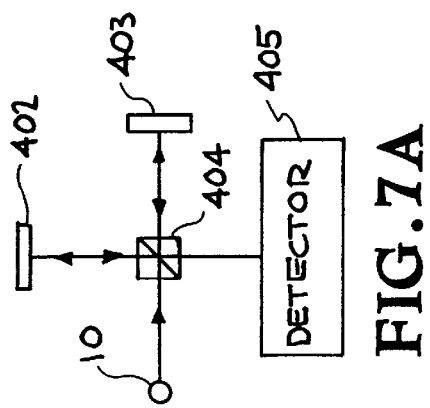
FIG. 7D

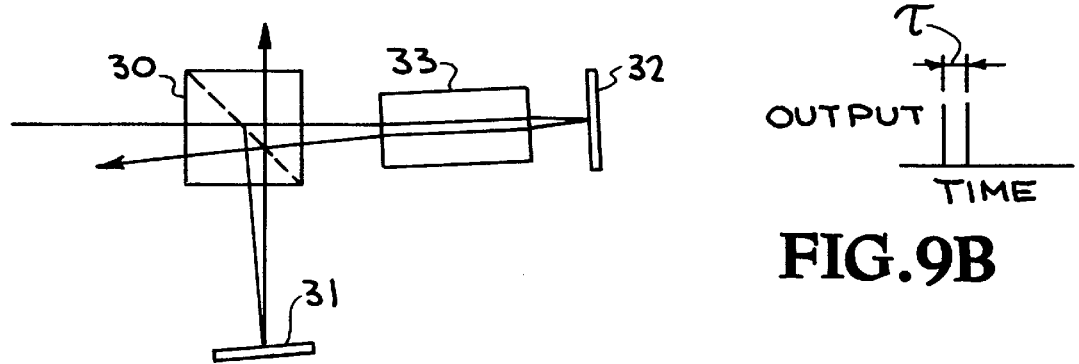
FIG.9A
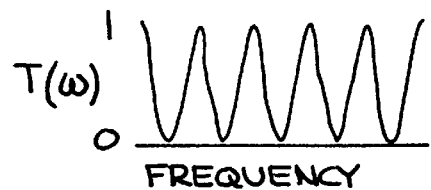
FIG.9B
FIG.9C
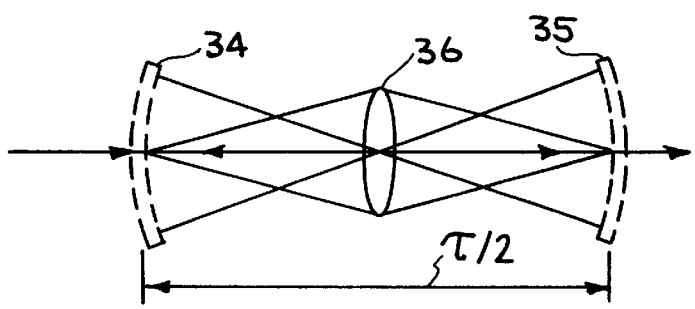
FIG.9D
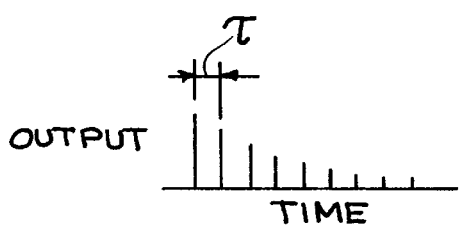
FIG.9E
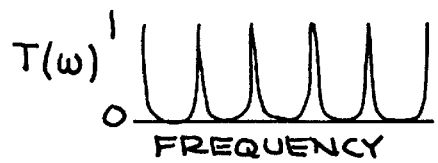
FIG.9F

WHITE LIGHT VELOCITY INTERFEROMETER

This application is a continuation of application Ser. No. 08/597,082, filed Feb. 5, 1996, now U.S. Pat. No. 5,642,194.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to velocimetry, and more specifically, it relates to the use of a velocity interferometer capable of using unlimited bandwidth illumination.

2. Description of Related Art

Measuring the velocity of an object remotely through the Doppler shift of reflected wave radiation (electromagnetic waves, sound) is an important diagnostic tool in a variety of fields in science and engineering. In shock physics, velocity interferometry is an important optical technique measuring velocities of impacted targets, typically moving 1–10 km/s. In law enforcement and meteorology, other kinds of Doppler velocimeters using microwaves measure velocities of automobiles and raindrops. And in medicine using ultrasound, Doppler instruments detect the motion of blood in vivo. All these velocimeters require coherent quasi-monochromatic illumination, which is generally more expensive and lower power than broadband incoherent sources, for any kind of wave radiation. For example using light, for the single interferometer velocimeter, the illumination was previously restricted to lasers operating in a single longitudinal frequency mode, which reduces their power. For the double interferometer velocimeter (U.S. Pat. No. 4,915,499), the illumination was restricted to less than 4 nm. In comparison, visible light (red to blue) has a bandwidth of approximately 200 nm. (The limited bandwidth was calculated by the authors of that patent in an article "Multiple-line laser Doppler velocimetry" by S. Gidon and G. Behar, Applied Optics Vol. 27, p2315–2319, 1988, on page 2317, below Equation 11.)

The invention and the prior art velocimetry discussed here is characterized by a single illuminating beam striking the target. This is distinguished from another widely used velocimetry technique using two intersecting laser beams in a transparent fluid, in which scattering particles carried by the fluid pass through a standing wave grating created by the intersecting beams. That technique is commonly called LDV, for laser Doppler velocimetry. (The title is not helpful in distinguishing the different kinds of prior art, since they all are based on Doppler shifts and almost all on laser illumination.)

The prior art of velocity interferometry (single beam striking the target) can be classified into kinds using a single interferometer, or two interferometers before and after the target. The former is much more common. For use with light, single interferometer velocimeters are distinguished by the kind of interferometer. Those using monochromatic superimposing Michelson interferometers are called VISARs (velocity interferometer system for any reflector), and those using non-superimposing Fabry-Perot interferometers are called Fabry-Perot velocimeters. The latter are non-superimposing because of their design, (and their method of use depends on the non-superimposing nature through the creation of off-axis fringes which shift in angle with velocity.) The definition of superimposing will be defined later. A double interferometer using two non-superimposing Fabry-Perot interferometers is described in U.S. Pat. No. 4,915,499.

The prior art either uses single interferometers, or double interferometers lacking in the proper superimposing quality. The prior art did not recognize that in order to use unlimited bandwidth incoherent illumination, two achromatic superimposing interferometers are needed, before and after the target. (The two can be optionally conveniently accomplished with one set of interferometer optics by retro-reflecting the light from the target.) Furthermore, the superimposing designs presented in the present invention are achromatic, whereas the prior art of single superimposing interferometers (VISARs) suffered chromatic aberrations which limit their use to monochromatic light.

The distinction between the superimposing quality of the present invention and the non-superimposing quality of the prior art is important to understand, and is crucial in creating many of the beneficial capabilities of this invention. The non-superimposing velodmeter cannot use all the illuminating power available from a non-directional broadband source, such as an incandescent lamp, due to limits on bandwidth or numerical aperture. It cannot form an imaging velocimeter. It cannot use unlimited bandwidth illumination from an uncollimated source. This in turn prevents many desirable capabilities that come from a wide bandwidth, such as simultaneous multiple velocity detection, unambiguous velocity determination, independence from target and illumination color, and lack of speckle.

The velocity sensitivity of all the velocity interferometers discussed, single or dual interferometer, superimposing or non-superimposing, broad or narrowband, all have the same fundamental relationship between fringe phase shift for a specific color, and target velocity. This will be described now. The additional advantageous that come with broadband illumination will be discussed later.

The single interferometer velocimeter consists of a monochromatic source illuminating the target, and an interferometer analyzing the reflected radiation. If the interferometer is a Michelson design, it has a fixed delay $\tau$ between its two arms. In the case of a Fabry-Perot interferometer, $\tau$ describes the delay between multiple output pulses produced from a single input pulse, if the illumination was considered hypothetically to be a stream of independent pulses. The nonzero value of the delay converts small Doppler shifts of the reflected light spectrum into fringe shifts in the interferometer output. Fringes denote the fluctuations in time-averaged output intensity which vary sinusoidally with target velocity v. There is a proportionality $\eta$ between the target velocity and fringe phase shift for a specific wavelength of illumination described by $$\eta = \frac{\lambda}{2\tau} \tag{1A}$$

and $\lambda$ is the average wavelength of light. For example, to measure highway velocities in green light, $\eta$ should be of the order 10 m/s, which requires $c\tau = 8$ m, where c is the speed of light. (Delays are conveniently described either by duration $\tau$, or the distance light travels in that time $c\tau$.) Equation (1A) neglects dispersion in the glass optics inside the interferometer, assumes $v/c \ll 1$ and that light reflects normally off the target. The velocimeter can measure target displacement or velocity, depending on the time scale of the recording system. If the detector response time is very fast, faster than the interferometer delays, but still slower than a system coherence time $L_{sys}/c$, then the fringe shift $\Delta f$ is related to a displacement of the target according to $$\Delta\phi = \frac{2d}{\lambda} \quad (1B)$$

where d is component of the target motion toward the source and detecting interferometers. This is not the typical situation. Typically the detector or recording equipment response time is slower than the delay time t. In this case, the fringe shift is related to velocity according to $$\Delta\phi = \frac{2v\tau}{\lambda} \quad (1C)$$

The velocity component of the target toward the velocimeter is obtained from the fringe phase shift $\Delta\phi$ by $$v = \Delta\phi\eta = \frac{\lambda}{2\tau}\Delta\phi \quad (2)$$

In previous velocimeters, the coherence length ($\Lambda$) of the illumination must be as large as $c\tau$ in order to produce fringes with significant visibility. This severely restricted the kind of light source which could be used. The $\Lambda$ of white light (~1.5 $\mu$m) was insufficient. Previously, lasers were the only light sources used because their coherence length could be made sufficiently long when operated in a single frequency mode. However, in this mode the output power is low.

The low output power restricted the applications of optical velocimetry. Typical laboratory measurements in shock physics were limited to measurement of velocity at a single point on the target. These experiments, and many other laboratory and industrial applications can be greatly improved if sample velocity could be measured simultaneously at more than one point, such as over a line or an area. For example, to measure the velocity field over an area at a single moment in a wind tunnel, or to measure the complex motion of an exploding non-symmetrical object.

However, measuring velocity over a line or an area in a snap-shot requires orders of magnitude more power than what can be provided by single mode lasers. Amplifiers can be used to boost laser power, however, these are expensive and bulky. Furthermore, velocimetry of a remote object through a telescope in the field demands orders of magnitude more power, since reflected light intensity is weak. Previously, the velocity can be measured over an area by scanning a single point measuring beam. However, this is not appropriate for measuring complex dynamic events such as turbulence, which grow on a time scale faster than the scanning can be completed. In contrast, the invention we describe can measure velocities simultaneously over an area, taking advantage of the velocimeter's imaging capability, and the higher power available from inexpensive and compact broadband incoherent sources. These sources are not suitable for a conventional velocity interferometer due to their incoherence. Even the prior art double Fabry-Perot velocimeter can only use but a fraction of the available power because its 4 nm bandwidth limit is approximately 1/50th of the visible spectrum. Secondly, it cannot be used in an imaging mode because its non-superimposing Fabry-Perot creates fringes as a function of ray angle off the central axis. In contrast, the superimposing Fabry-Perot described in this application creates a fringe phase which is constant over a range of ray angles.

For the purpose of illuminating a target over a wide area, the directional quality of a laser beam is not a comparative advantage, since the laser light must be dispersed to cover the area, and the target will usually randomly scatter the reflected light in all directions. For example, a $50,000 argon laser operating in single-frequency mode only produces approximately 1 watt of power. In contrast, a flashlamp costing a $1000 dollars can create perhaps a 100,000 watts. If the superimposing interferometers are achromatic and have a large numerical aperture capability, then a large fraction of the ray angles and colors of the flashlamp can be utilized for white light velocimetry. Thus, for illuminating an area, more illuminating power can be obtained from the flashlamp than the laser, and for less expense.

SUMMARY OF THE INVENTION

It is an object of the present invention to measure the velocity of objects using incoherent and broadband light, microwaves or sound. This requires two achromatic superimposing interferometers in series, with the target interposed, topologically.

It is another object of the invention to delay the light rays of one interferometer arm in time, yet superimpose them in path, to create a superimposing delay and hence a superimposing interferometer. It is an object to make these delays achromatic, that is, satisfy the superimposing conditions for a wide range of wavelengths and input ray angles.

It is another object of the invention to optionally measure velocity at more than just a single point on the target surface, by forming a line or a real image of the target at the detector which manifest fringes from which the velocity is deduced. This requires a superimposing interferometer.

It is another object of the invention to optionally use illumination whose wavelength changes with time (chirped), in conjunction with a spectrally or delay-organized detector, so as to record velocity and reflectivity of objects versus time in analogy to an electronic streak camera. This requires an achromatic superimposing interferometer.

The first object is achieved only through the simultaneous use of two conditions 1) two matched interferometers are in series with the target interposed; and 2) the interferometers must be achromatically superimposing. When the interferometer delays match within a system coherence length, partial fringes are produced which shift with target velocity via the Doppler effect. The invention is a generic method for using broadband incoherent radiation in a velocity interferometer. The principle is applicable to any wave phenomenon for which superimposing interferometers can be constructed, such as light, sound, and microwaves. Thus, lasers and monochromatic sound and microwave sources are no longer required to observe small Doppler shifts. For example, impulsive sound created by pulses of laser light communicated to a patients body through optical fibers can now be used for Doppler ultrasound imaging, where previously it was prohibited due to incoherence.

The fourth object will form a device capable of measuring velocities and reflectivities of objects down to 2 ps time resolution when used with chirped illumination. This embodiment is called a chirped pulse velocimeter. "Chirped" light is defined herein as light which instantaneously has an approximately pure color that varies with time. It forms a kind of optical streaking camera, similar to an electronic streak camera, whose time resolution is not affected by the motion of electrons, but by the wave properties of light.

The superimposing requirement for the interferometers is mandatory in the case of light and other waves which travel in media in more than one dimension. If the waves are expressed as a 1-dimensional quantity, such as the voltage in an electrical cable leading from an antenna or a transducer, the superimposing requirement is moot, since there is only one ray path, not a manifold of paths. In that case, the interferometers can use a simple time delay, implemented by electronics or mathematically implemented through software.

The purpose of this invention is to allow for the first time the use of unlimited bandwidth incoherent illumination, which we term "white". In this application, the term "white" denotes the broadband incoherent quality of waves of any kind, not restricted to light, such as microwaves and sound. The present invention is a double interferometer system using broadband (achromatic) superimposing interferometers of a general kind. It is distinguished from the prior art by achromatic superimposing quality of the interferometers.

BRIEF DESCRIPTION OF THE DRAWINGS

FIG. 4 shows an embodiment of the white light velocimeter for measuring fluid flow.

FIG. 5A shows a wavelength distributed system.

FIGS. 7A–7F illustrates the effect tilting a mirror has on delay.

FIG. 9A shows the Michelson class interferometer.

FIG. 9B shows the impulse response for the Michelson class interferometer.

FIG. 9C shows the sinusoidal power transmission spectrum for the Michelson class interferometer.

FIG. 9D shows the Fabry-Perot class interferometer.

FIG. 9E shows the impulse response for the Fabry-Perot class interferometer.

FIG. 9F shows the thinner peaks of the Fabry-Perot class power transmission spectrum.

DETAILED DESCRIPTION OF THE INVENTION

Figure 1A:
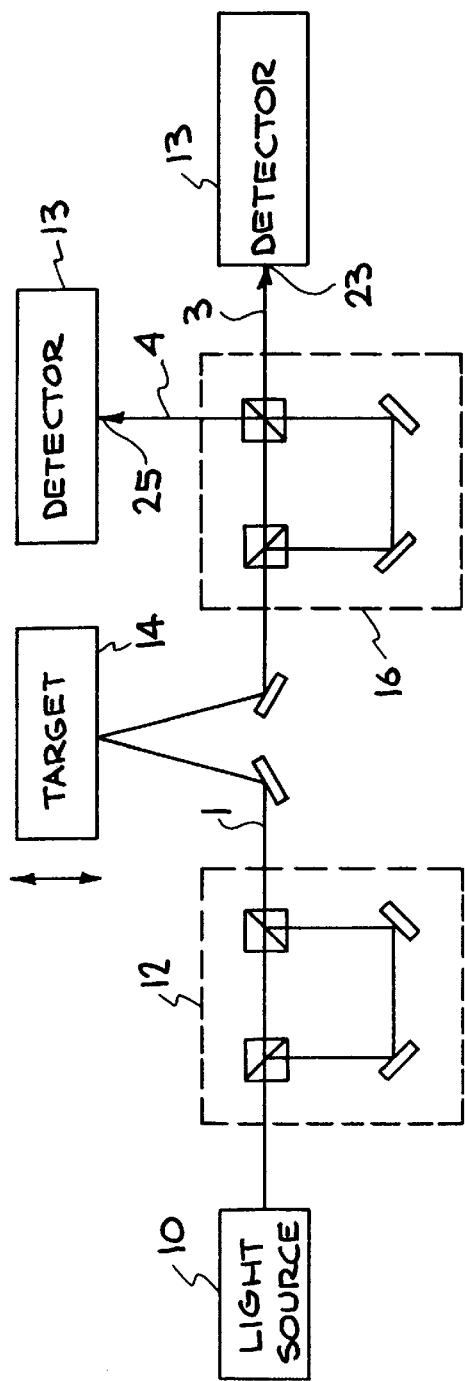
FIG. 1A illustrates the white light velocimeter concept of the present invention.

FIG. 1A illustrates the white light velocimeter concept of the present invention. A coherent echo is imprinted on the illuminating light 10 by a superimposing interferometer (denoted the source interferometer 12) having a delay $\tau_s$. The reflected light from the target 14 is observed through a second superimposing interferometer (denoted the detecting interferometer 16) having delay $\tau_d$. FIG. 1A is a topological diagram only, the detailed positions of optics internal to the interferometers is not meant to be depicted. The time averaged output intensity is observed by a detector or camera. Partial fringes result when $\tau_s \approx \tau_d$.

Figure 1B:
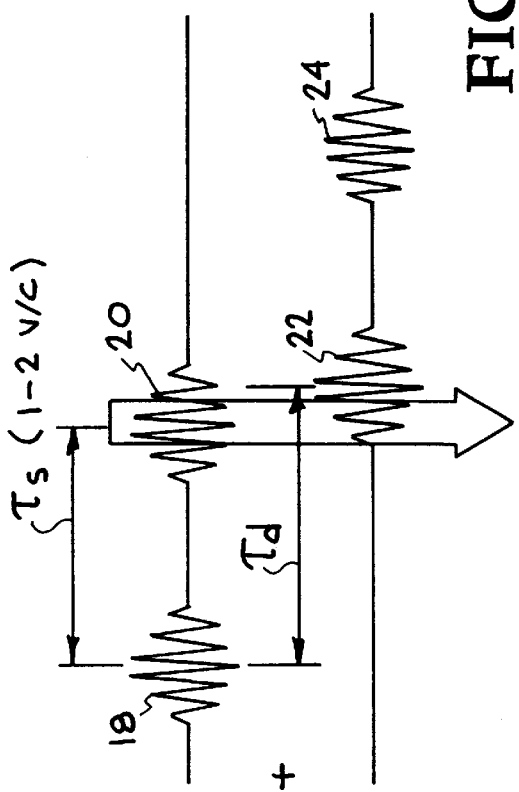
FIG. 1B models white light by a series of independent wave packets.

Suppose white light is modeled by a series of independent wave packets, as shown in FIG. 1B. The source interferometer 12 splits each packet into two identical packets (18, 20). The detecting interferometer does the same to create four of the two (22, 24). Two of those packets (20, 22) will overlap and interfere if $\tau_s \approx \tau_d$, within a coherence length, contributing fringes to the net detected intensity 23. Target 14 motion will change apparent $\tau_s$ due to the Doppler scaling of the spectrum, causing a fringe shift in the detecting interferometer output intensity 23. The velocity is approximately given by the fringe phase shift according to Eq. (2), where $\lambda$ is the average wavelength of the light reaching the detector.

The other components (18, 24) add incoherently and contribute nonfringing components. Thus the visibility of the fringes are always partial (although use of a high finesse Fabry-Perot as the source interferometer 12 can arbitrarily increase fringe visibility at the expense of throughput). The fringe visibility can be made 100% by simultaneously recording both complementary detecting interferometer outputs (23, 25) and numerically or electronically subtracting them. This also eliminates extraneous light, which is defined light that has not passed through the source interferometer.

Figure 2:
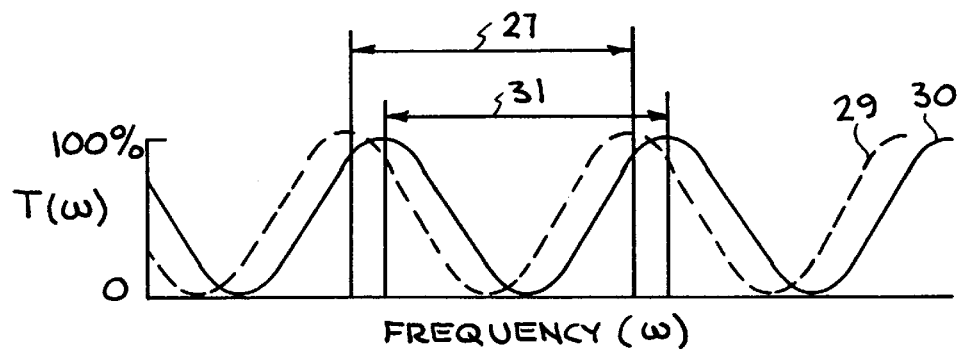
FIG. 2 compares $T(\omega)$ for source and detecting interferometers.

An equivalent explanation of the basis of operation is to consider each interferometer to be a filter which has a periodic power transmission spectrum $T(\omega)$, also called a "comb" filter. FIG. 2 compares $T(\omega)$ for source and detecting interferometers. For each comb filter 29, 30, the periodicity in frequency 27, 31 is inversely proportional to the time delay. If $\tau_s = \tau_d$ and the target is stationary, then transmission peaks of the source comb filter overlap peaks of the detecting comb filter. This produces a "bright" fringe in the output. If the target moves, the source spectrum is changed (multiplied by 1+2v/c) by the Doppler effect, so that the peaks of the source filter may no longer correspond to the peaks of the detecting comb filter, as depicted in FIG. 2. This produces a "dark" fringe in output intensity of the light passing through both interferometers, integrated over all frequencies. (This is similar to the creation of a Moiré pattern from two finely spaced grids.) Depending on the illumination bandwidth, the integrated overlap of source and detecting comb filter peaks goes in and out of phase as the target velocity increases, producing a sequence of light or dark fringes.

The exact description of the time-averaged detecting interferometer output intensity <I> for a target velocity v is given by the overlap integral over angular frequency $\omega$ $$\langle I \rangle \propto \int_0^\infty d\omega S(\omega/D_2) T_s(\omega/D_2) R_t(\omega/D_1) T_d(\omega) P(\omega). \quad (3)$$

where $$D_2 = (1+2v/c). \quad (4)$$

and $$D_1 = (1+v/c). \quad (5)$$

are Doppler multipliers, valid when v<<c. $S(\omega)$ and $P(\omega)$ are the power spectra of the illumination and detector sensitivities, respectively. $T_s(\omega)$ and $T_d(\omega)$ are the power transmission spectra of the source and detecting interferometers respectively. These are calculated by the magnitude squared of the Fourier transform of the impulse response in the electric field.

An idealized dispersionless Michelson interferometer (a 50% reflective beamsplitter is assumed for this discussion) has $$T(\omega) = \frac{1}{2}(1 + \cos \omega \tau). \quad (6)$$

A superimposing Fabry-Perot interferometer has $$T(\omega) = [1 + \alpha \sin^2(\omega \tau/2)]^{-1} \quad (7)$$

where $\alpha$ is related to its mirror reflectivity R by $\alpha = 4R/(1-R)^2$. Here we assumed both cavity mirrors have the same reflectivity. However, this is not required in general.

Assuming that the light from illuminating source 12 reflects nearly normally from the target 14, then the term velocity means the component toward the source/detector. However, the source 12 can illuminate laterally, or approximately on the opposite side of the target 14 so that a transverse velocity component is measured. This could be advantageous in fluid flow measurements. In all cases, it is the rate of increase of the path length sourcetarget-detector which is being measured.

In the sense that the two inner pulses (20, 22) of FIG. 1B are being compared by time of arrival, white light velodmetry is related to optical coherence tomography (OCT), which uses incoherent light to measure differences between two interferometer mirror displacements. The distinction is that in OCT, the target plays the role of one of the interferometer mirrors, that is, the target is internal to an interferometer. In white light velocimetry, the target is external to any interferometer. This is a great advantage for uncooperative targets, since strict alignment is not required, as in OCT.

In FIG. 1A, the box-like constructions for source interferometer 12 and detecting interferometer 16 are icons representing generic amplitude-splitting interferometers which satisfy the superposition condition. The complementary outputs are not always drawn, but are implied. Their use is not mandatory, but is usually helpful. Michelson, Mach-Zehnder, Sagnac, or special Fabry-Perot design interferometers can be modified to satisfy the superposing condition and therefore be usable in this velocimeter (the ordinary Fabry-Perot design will not work because it is not superimposing).

The source interferometer 12 and detecting interferometer 16 need not be the same design. For example, the source and target may have different numerical aperture requirements, so that optimal designs are different. Also, since the complementary source interferometer output is discarded in the simplest configuration, the source interferometer can have a more streamlined designed, such as an inline superimposing Fabry-Perot.

On the other hand, if it is desired, the role of both interferometers can be performed by the same optics by observing the light retro-reflecting from the target 14 back toward the source. This is accomplished simply by identifying in the source interferometer the output beam coming from the target. This automatically satisfies $\tau_s \approx \tau_d$ and greatly simplifies alignment. However, separate interferometers will be desired for the case of illumination that is very intense relative to reflected light, to avoid the glare from shared optics.

It is recommended, but not necessary, that both complementary outputs 3 & 4 of the detecting interferometer be recorded. By numerically or electronically subtracting their signals, any background light that has not passed through source interferometer will be eliminated from the signal. This is called "push-pull" processing of the signals. Secondly, the determination of fringe phase will be much more accurate for fluctuating target reflectivity, since the difference signal will be known to be centered about zero. Thirdly, when the velocimeter is used in a single-channel velocity discriminator mode, only the objects having the required velocity will produce a nonzero image in the difference signal. Fourthly, if the complementary signals are added instead of subtracted, then the non-fringing (i.e., ordinary) image will be obtained without speckle. This is useful for the presentation of the data; the velocity map created from interpreting the fringing image can be later graphically overlaid with the non-fringing image.

The summed signal will also give the system spectrum, that is, the combined spectrum of the illumination, target reflectivity and detector power sensitivity. The bandwidth of the system spectrum is represented by $\Delta\lambda_{sys}$, and is important for determining the fringing behavior of the velocimeter.

It will be implied in the descriptions below, although not explicitly shown for clarity, that what ever optical manipulations are done to one detecting output, may also be done simultaneously to the other complementary detecting output, and that these outputs may subsequently be subtracted or summed after conversion to a voltage or digital value. A velocity can be determined using either complementary outputs singly, or both as a difference signal.

Furthermore, many techniques that have been employed for conventional VISAR velocimeters can be utilized for the present invention. For example, the use of a $\lambda/4$ retarder to produce a 90° phase lag between vertical and horizontal polarizations is commonly used to determine the direction (polarity of change) of the fringe shift in conventional VISARs. This technique can also be used in the present invention, although it is redundant in many cases since the use of broadband illumination in a multi-channel mode can determine fringe shift polarity. One situation where it wouldn't be redundant is when the velodmeter is used with chirped pulse illumination.

In the simplest white light velocimeter configuration (FIG. 3A), one of the complementary outputs 2 of the source interferometer is discarded. This is fundamentally necessary to produce the valleys in the source interferometer's power transmission spectra. Without the valleys, the changing overlap between source and detecting spectra will not produce fluctuations in the detecting output, and hence no fringes would be produced. Thus in the simplest configuration shown in FIG. 3A, which uses a Michelson source interferometer with 50% reflective beamsplitter, 50% of the source power must be discarded.

Figure 3A:
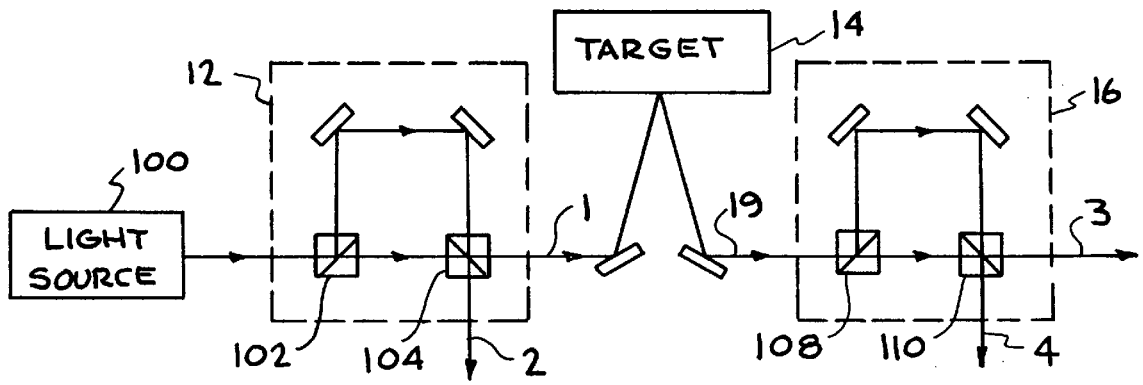
FIG. 3A shows a simple white light velocimeter configuration.
Figure 3B:
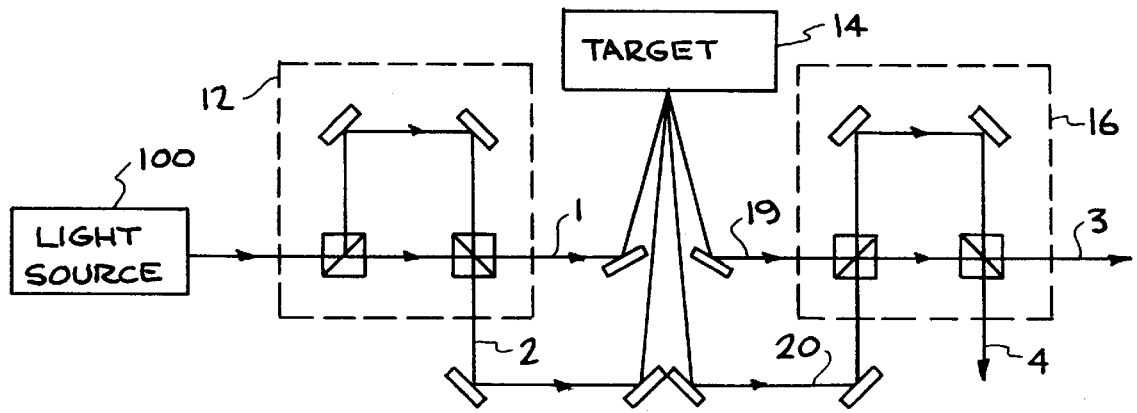
FIG. 3B shows the use of angle of incidence to distinguish the beams reflecting from a target.

FIG. 3A is a topological diagram only. The beamsplitters 102 and 104 are shown separately for clarity; in actuality, they may simply be a different portion of the same optical piece. Similarly for beamsplitters 108 and 110. Each interferometer (12 and 16) has two complementary outputs (1, 2 and 3, 4). Each also has two complementary inputs (only 19 and 20 are shown). Broadband light from the source enters the source interferometer and is evenly divided between the two source outputs 1 and 2. In the simplest configuration (FIG. 3A), only one of these outputs, 1, is used to illuminate the target. In the complex configuration (FIG. 3B), both outputs are used. However, the outputs must be distinguished from each other as they reflect off the target. This can be accomplished by polarization or angle of incidence. If polarization is used, then polarizing beamsplitters can be used for all the beamsplitters. FIG. 3B shows the case where angle of incidence is used to distinguish the beams reflecting from the target. The two reflected beams enter the two complementary inputs 19 and 20 of the detecting interferometer. Therefore, 100% of the illuminating power is used in the complex configuration.

FIG. 4 shows an example application of a white light velocimeter measuring fluid flow, such as a gas jet seeded with light scattering partides. The arrangement consisting of a light source 160 (e.g., a flashlamp), whose light passes through a source interferometer 162 and enters a thick illuminating fiber 166. Light leaving the fiber is collimated by a cylindrical lens 168 into a fan-like shape which illuminates a thin slab of the jet volume 170. The light scattered from particles in the jet is observed by one or more camera systems 174, each which observe through a detecting interferometer 172. The detecting interferometer delays are matched to the source interferometer in order to produce fringes. The details of the camera systems are left unspecified. They could be one of a variety of configurations, measuring a point, a line, or an area of the target. The purpose of FIG. 4 is to show that 1) if the source interferometer optics have sufficiently low aberrations such that $c\tau_s$ is the same for all rays within $\lambda/8$, a non-imaging system such as a thick multi-mode fiber can be used to communicate the imprinted light from the source interferometer to the target. 2) In order to measure different velocity components, there can be more than one detector and the illumination can be laterally oriented. The velocity component which is sensed by each camera is given by the vector sum of two unit length vectors: target-camera and target-source. By having two cameras on opposite sides of the target and the illumination to the top, the vertical and transverse components can be resolved. With one or more additional cameras mounted out of the plane of FIG. 4, the remaining velocity component can be resolved.

Let $\Delta\lambda_{sys}$ be the system bandwidth, which is defined the spectral width of light having passed through all the optical elements and converted to electrical signal by the photodetector, including target reflectivity, photodetector responsivity and illumination color. The system coherence length is $\Lambda_{sys}=\lambda^2/\Delta\lambda_{sys}$. Partial fringes result only when $|c\tau_s - c\tau_d| \approx \Lambda_{sys}/2$. Since target velocity causes a change in effective $\tau_s$, the range of velocities which produce visible fringes is controlled by the system bandwidth through $$\left| \frac{c\tau_s}{1+2v/c} - c\tau_d \right| < \frac{1}{2}\Lambda_{sys}. \qquad (9)$$

Equation (9) is for a single detecting channel. Many of the attractive velocimeter features are implemented by a multi-channel velocimeter. The multiple detecting channels can be organized by wavelength or by delay $\tau_d$. In the former case, the individual channel bandwidth is very narrow, and $\tau_d$ is the same for every channel. In the latter, the channel bandwidth is very wide, but $\tau_d$ is different for each channel. These two modes are described in more detail later.

The theoretical reason for requiring the superimposing condition for the interferometers is as follows. Let the condition where interference is prevented be called interfereless. (This could be achieved in concept by blocking one of the two interferometer arms in the case of a Michelson, or zeroing the partial reflectivity of the mirrors in the case of a Fabry-Perot.) Let the optical field in the region of an extended incoherent source be S(t, r) and the field at every point "downstream" through an interfereless optical system be H(t, r) where r is a position vector. Now, restoring the interference, if the output rays of the interferometer beams exactly superimpose, so that the images of the source viewed through the interferometer superimpose both transversely and longitudinally, then we say the superposition condition is satisfied. In the case of a multiple echo interferometer such as a Fabry-Perot, this condition must apply to each echo.

If this condition is satisfied for the source interferometer 12, then the velocimeter can be equivalently be expressed as an interfereless system having an effective source S(t,r)+S(t+τ,r), which produces an optical field everywhere downstream H(t,r)+H(t+τ,r). If the detecting interferometer 16 also superimposes, then the velocimeter output corresponds to H(t,r)+H(t+$\tau_s$,r)+H(t+$\tau_d$,r)+H(t+$\tau_s$+$\tau_d$,r). The point is that these expressions are easy to analyze since they all share the same spatial dependence- the same as an interfereless system, which is covered by traditional optics.

Thus in the superimposing case, the spatial dimensions can be ignored and only the temporal behavior need be solved. The problem collapses to 1-dimension, as if the signals were propagating along wires. This greatly simplifies the analysis.

If the superposition condition is violated, then the source is described as S(t,r)+S(t+τ,r+δr) where δr is the displacement vector between the source images seen in the beamsplitter. This produces a complicated optical field downstream since the two terms do not share the same spatial dependence. For sufficiently large δr, the fringes at the velocimeter output will wash out and therefore fail to give a readable velocity signal. Since some image displacement is inevitable through imperfect optics, an estimate is made of the maximum value of δr which maintains significantly visible fringes. This will tell us the maximum amount of aberrations we can tolerate in the interferometer optics.

A very practical consequence of the superimposing condition is that the path between the target and velocimeter can contain distorting or dispersive elements, or a non-imaging system such as an optical fiber without effecting the fringe visibility (for a uniform velocity target and constant distortion). In other words, high quality optics are needed only internal to the interferometers. This feature is highly desired for the use of a velocimeter on out of door targets, or communicating light between the velocimeter apparatus and the target through optical fiber, such as in an industrial situation. Once the echoes have been imprinted on the illuminating beam, their phase relationship is maintained, since both echoes propagate over the same path (assuming the distortion changes slowly compared to τ).

Secondly, the superposition argument above shows that an imaging velocimeter can be produced if the interfereless form of the optics produces an image. Each point of the image has a time averaged intensity dependence which is described by the 1-d theory below.

There are three modes of detecting the fringes and interpreting them into velocity: 1) single-channel; 2) multi-channel delay-distributed; and 3) multi-channel wavelength-distributed. The three are mathematically related. Many of the attractive velocimeter features, such as simultaneous multiple velocity detection, only come from the use of the multi-channel modality. The single-channel modality must be understood to understand the multi-channel modality. All these modalities apply to interpreting the velocity of the target at a single target point. For a line or areal imaging velocimeter, the modalities apply to each pixel of the image.

In the case of a single detecting channel, broadband illumination will produce a velocimeter with a narrow velocity range. From Equation (9), the center of the velocity range is given by $$v_{center} = \frac{\tau_s - \tau_d}{\tau_s}\left(\frac{c}{2}\right) \quad (10)$$

and the range width is $$v_{width} = \frac{\Lambda_{sys}}{c\tau_s}\left(\frac{c}{2}\right). \quad (11)$$

Thus, a broad spectrum produces a narrow $\Lambda_{sys}$, which in turn yields a narrow range of velocities that give visible fringes.

This narrowness can be used as a velocity selector or discriminator. By numerically subtracting the complementary detecting interferometer outputs after detection, only the fringing targets will produce a nonzero difference signal. This is particularly useful for an imaging velocimeter, since this means only the objects having a specific velocity component will appear different from the background image. For example in a radar or LIDAR application, if there are a multitude of missiles approaching, and one is only interested in detecting the missiles having a velocity component indicating that they will impact somewhere important, then the operator would set the interferometer delays according to Eq. (10) so that only those velocities produce fringes.

Velocimeters implemented with multiple output channels, organized either by delay or wavelength, offer many attractive features. The advantages include a much greater velocity range for a given overall bandwidth, independence from target and illumination color, an absolute velocity determination, and the ability to detect simultaneous multiple velocities. The latter two abilities are very important, particularly in the field of shock physics where discontinuous accelerations and disintegrating materials create difficult targets. The ability to determine absolute velocity from a target acquired after it has accelerated (suddenly appearing at the horizon) is very important for LIDAR and radar velocimetry, as is being able to discriminate targets against stationary clutter such as chaff.

A wavelength distributed system is shown in FIG. 5A. This consists of the white light velocimeter of FIG. 1A with the added prism 90 to disperse the output according to wavelength across a set 92 of multiple detecting channels. In a single target-point mode, the point is dispersed into a line which can be shown on the slit of a streak camera to be recorded. In a line-target mode, the line is dispersed into a rectangle which can be recorded by a multi-channel areal detector such as a CCD array, or film. Since a rectangle cannot be dispersed into a third dimension, a two-dimensional image of the target can be measured if one can uses multiple discrete two-dimensional detectors, each with bandpass filters to limit the wavelengths detected. Even a modest number of channels, such as 3 or 4, provide advantages, particularly if the channel center wavelengths are widely separated.

The greatest advantages of this wavelength-organized system will be when there are many channels individually having a very narrow bandwidth $\Delta\lambda_{sys}$, but collectively having a wide bandwidth. When each channel's $\Delta\lambda_{sys}$ is very small, then individually each channel has a very large velocity range according to Eq. (10). That is, for an accelerating target many fringes can pass before their visibility diminishes. This allows a small velocity per fringe coefficient η, which increases the velocity resolution.

Figure 5B:
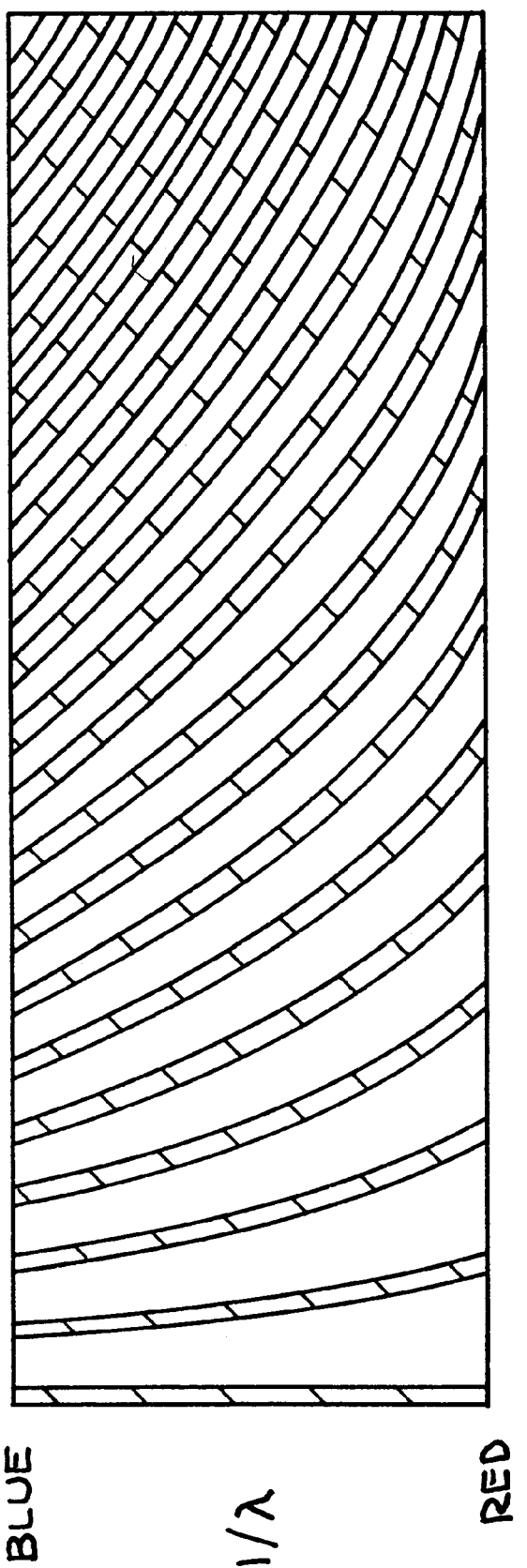
FIG. 5B shows the simulated spectrum for a single target point versus velocity for a fixed source-detector delay difference.

FIG. 5B shows the simulated spectrum for a single target point versus velocity for a fixed source-detector delay difference. The vertical scale is proportional to 1/λ or light frequency ω. The dark bands represent fringe maxima or minima, depending on which complementary detecting output is observed. The plot for negative velocities is a reflection of the positive side. For a given target velocity, the number of fringes counting along a vertical slice of the graph will indicate the velocity. This can be mathematically accomplished by taking the Fourier transform of the intensity along the vertical slice. A given spatial frequency component will correspond to a given target velocity. The higher the velocity, the higher the spatial frequency.

If more than one target having different velocities is in the velocimeter field of view, then each target will contribute a different spatial frequency component. These can be resolved if the velocities are sufficiently different compared to η, given by Eq. (1). The greater the amplitude of that Fourier component, the greater the net target area moving with that velocity.

In a delay-distributed multi-channel system, each channel has the same system spectrum, which is optimally very wide, but at a different delay difference $(\tau_s-\tau_d)$. This can be accomplished by tilting one of the interferometer mirrors so that delay is a function of the output's transverse position on the camera's film plane. The reason tilting causes this is shown in FIGS. 7A–7F. FIG. 7A shows a Michelson interferometer with perfectly aligned mirrors 402, 403. From the point of view of the detector 405, the reflection of the source 10 appears in the beamsplitter 404 to be at two locations 400, 401. These are superimposed for the aligned Michelson in FIG. 7B. In FIG. 7C, mirror 402 is tilted out of alignment. This moves apparent position of the source 401 so that it does not superimpose with 400 (FIG. 7D). FIG. 7E shows a camera lens 406 imaging the two twin source images on to a film plane 407. Different positions along the film correspond to different angle $\theta$ of ray bundles leaving the source twin, and these have slightly different delay difference $\Delta$delay, shown in closeup FIG. 7F.

Figure 6A:
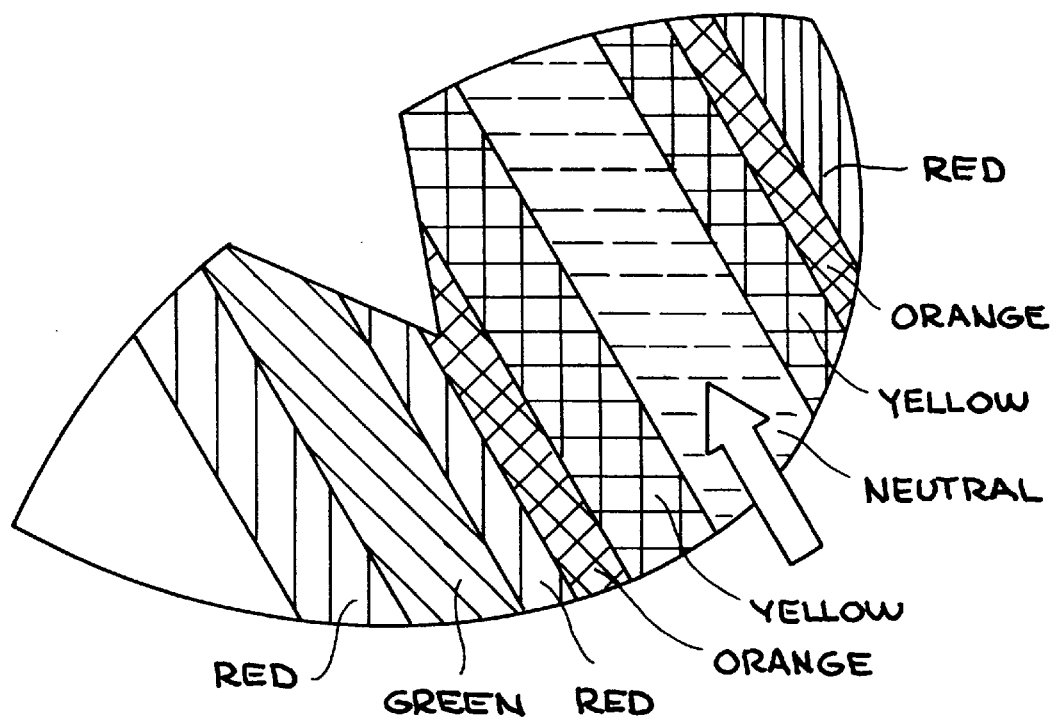
FIG. 6A depicts a fringe pattern of a stationary object.
Figure 6B:
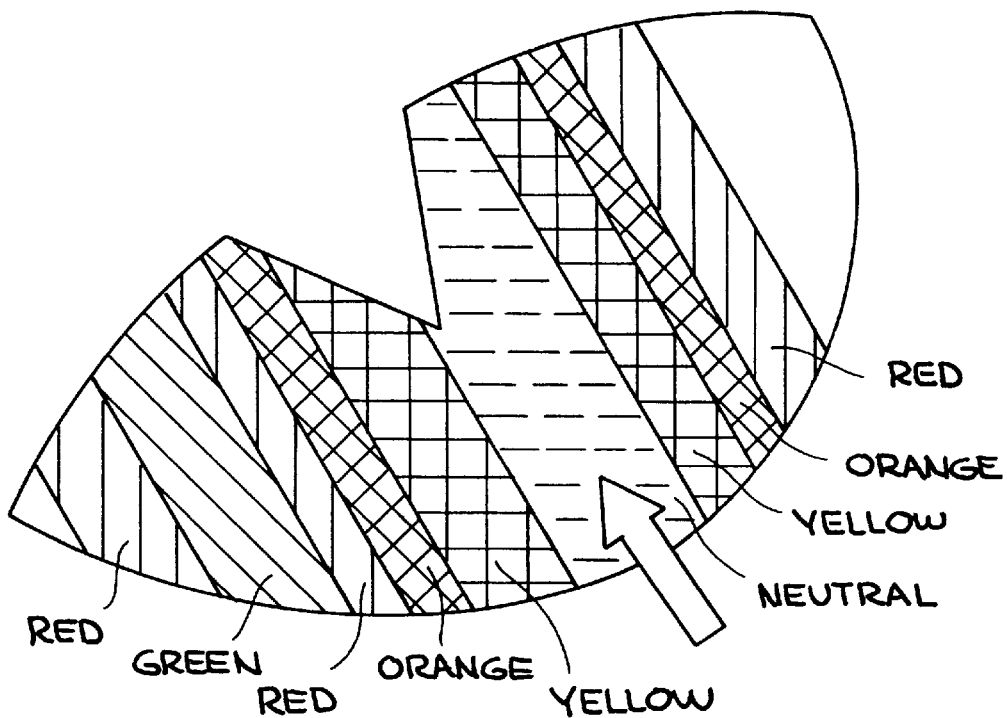
FIG. 6B depicts a fringe pattern of a moving target.

Position across FIG. 6A and 6B perpendicular to the fringe comb corresponds to increasing delay difference ($\tau_s$-$\tau_d$). Each resolvable column on the figure parallel to the fringe comb corresponds to a channel. Just as in the $\lambda$-distributed system, the wide bandwidth provides absolute velocity determination, multiple simultaneous velocity detection, and independence from details of the system spectrum.

Since the channel bandwidth is very wide, fringe visibility maximizes for a very specific delay difference satisfying Eq. (10). Integrating over the intensity changes of FIG. 6A shows the center of fringe pattern is at a well defined location indicated by the white arrow. For the stationary target (FIG. 6A), this corresponds to the location on the image where ($\tau_s$-$\tau_d$)=0. For the moving target (FIG. 6B), this corresponds to a different location on the image where ($\tau_s$-$\tau_d$)$\neq$0. Thus the center position of the fringe pattern yields the velocity.

The location of the center of the fringe pattern can be determined mathematically by Fourier analysis, from the phase shift of each component. This also determines the system spectrum, because each color produces a fringe comb component with periodic spacing proportional to $\lambda$, and amplitude equal to the intensity of the color. Thus, even though this modality does not use a prism or diffraction grating, or a wavelength sensitive detector, the color components and their relative intensities can be resolved. (This is the basis for an existing laboratory spectroscopy technique called Fourier transform spectroscopy). Thus, the wavelength and delay-organized multi-channel systems are mathematically related. Furthermore, this means that the chirped pulse streaking technique described later can be accomplished without a diffraction grating, if the detecting interferometer is operated in the delay-organized multi-channel mode.

Laser and other narrowband illumination can be applied to the white light velocimeter in the same manner as broadband light. However, the attractive features of absolute velocity determination and simultaneous multiple target detection are not available for monochromatic light. Some degree of these features can be retained if at least 2 or 3 colors are present, such as in a multi-line laser, i.e., Argon or Krypton ion laser. The should be aware that if $c\tau_s$ is smaller than the laser coherence length, (so that the interferometer free spectral range is larger than the laser bandwidth), slight adjustment of $\tau_s$ may cause the power to switch from one source interferometer output to the other. This is particularly relevant when using a multi-line laser, since $\tau_s$ should be selected such that the important spectral lines emerge from the same output arm.

An interesting application of the white light velocimeter is with specially prepared light called chirped light. This embodiment is called a chirped pulse streaking velocimeter and it can measure velocity or reflectivity changes versus time for every place on a line imaged across the target. The device is interesting because it can potentially reach very short time resolutions, down to 2 ps, depending on the amount of chirp on the light. Let us describe "chirped" light as light which instantaneously has an approximately pure color which varies with time. Chirped light is distinguished from incandescent broadband light in that there is never simultaneously two different colors present—the colors arrive in sequence. Chirped light is usually in pulsed form, but it could be a continuous beam if the frequency was scanned in a repetitive fashion. This could be produced by a CW or pulsed laser whose wavelength is caused to sweep by an intracavity electro-optic device, or by taking a very short laser pulse and sending it through a matched pair of diffraction gratings to stretch it. These techniques are common in laser laboratories.

The chirped pulse streaking velocimeter is obtained simply by using the white light velocimeter in a multi-channel mode with chirped illumination. Both the wavelength-organized and delay-organized multi-channel modalities can be used, since they are mathematically related. However, it is easiest to understand the operation of the device when it is in the spectrally organized mode. In that case a line image of the target is imaged to the slit before a prism or grating, which spectrally disperses the output. Because the instantaneous color of the light is changing with time, the output from the grating will sweep across an integrating recording medium such as film or a CCD camera.

Figure 8:
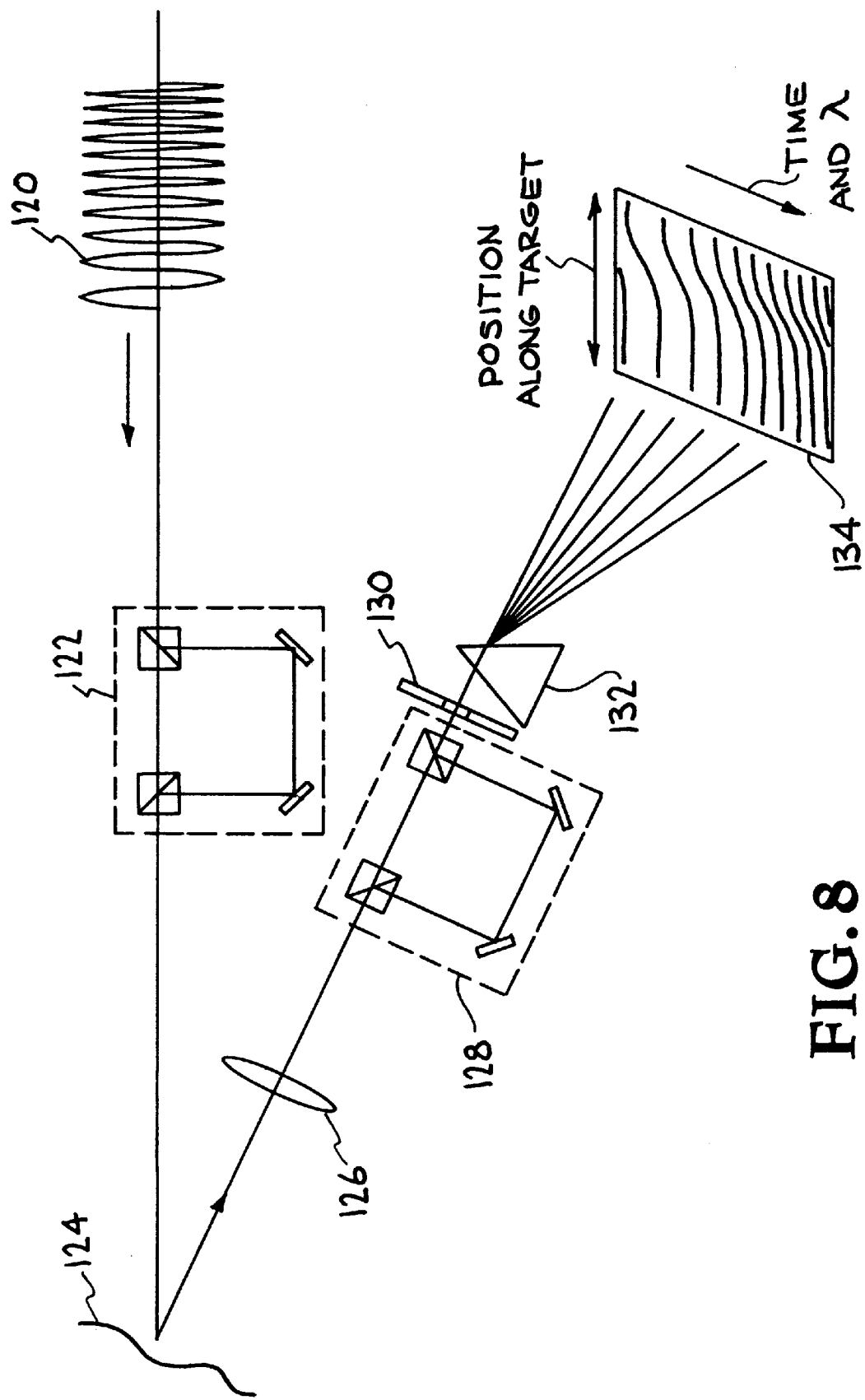
FIG. 8 shows the chirped pulse streaking velocimeter.

The chirped pulse streaking velocimeter of FIG. 8 consists of chirped pulse input 120, source interferometer 122, moving target 124, lens 126, detecting interferometer 128, slit 130, dispersive element 132 and film or CCD 134.

It is assumed that the instantaneous wavelength versus time is known by an independent measurement. Thus, the position along the streak record in the wavelength direction will correspond to time. The complementary detecting interferometer output can be similarly recorded, and the two signals subtracted or added. Fringe shifts in the difference signal are interpreted into a velocity versus time record using Equation (2). The sum signal yields the reflected target light intensity history.

The reader should note that because chirped light is instantaneously monochromatic, the chirp pulse velocimeter does not have the multiple-target, absolute velocity resolving features of the non-chirped broadband configuration. If these are desired, the user can operate the device in a hybrid configuration simply by using more complex illumination with the same optical apparatus. The complex illumination could consist of, for example, 3 simultaneous colors, which are all being swept across a wavelength range $\frac{1}{3}$ as wide as the full spectrum. That is, the illumination may start as red, yellow, and blue, and end up as orange, green and violet.

If the velocimeter detecting channels are organized by detecting delay, such as created by tilting an interferometer mirror, then the output beam will "sweep" in a different manner. (The grating is not used in this case.) As the different colors sequentially pass out the velocimeter, they will create fringe combs having different spatial frequencies. A one-for-one association can be made between a spatial frequency and a moment in time. Thus, in order to analyze the record, a Fourier transform of the recorded intensity is made. The phase shift for a given spatial frequency yields the instantaneous velocity, and the magnitude of the component yields the target reflected light intensity.

The optical streaking concept can be applied to create a much simpler device that measures only target reflectivities and not velocities. This embodiment is called a chirped pulse streaking camera. The two interferometers needed for velocimetry are discarded. The device simply consists of the grating dispersing the chirped output and the detector. The time resolution capability of this device is exactly the same as for the chirped pulse velocimeter. Alternatively, only the source interferometer is discarded, and the detecting interferometer is used in the delay-distributed mode without any grating.

The optical streaking of these inventions is analogous to that in an existing electronic streak camera, except that the sweep speed is not controlled by any electrical behavior inside the camera, but by the degree of chirp of the illumination entering the optics. Electronic streak cameras can suffer from jitter in the triggering time. That is, it takes a finite amount of time from the arrival of the trigger pulse to the beginning of the high voltage ramping (which sweeps the electrons), and this lag time can be unpredictable in singleshot experiments. The advantage of the optical streaking is that there is no jitter in the device's operation. The chirped diagnostic illumination can be synchronized by optical delays to the other laser beams which may drive the experiment being studied (such as studying the expansion of a laser-created plasma). Optical delays are controlled by physical distances, which are extremely reproducible from shot to shot. Secondly, apart from the expense of the chirped illumination, the chirped pulse streaking velocimeter and camera are relatively inexpensive optical devices to build, and an arbitrarily large number can be used to simultaneously observe the same experiment from different angles, all illuminated by the same chirped source.

To estimate the time resolution $\Delta t$, the chirped pulse was modeled as a series of transform limited elemental pulses of width $\Delta t$ concatenated over a duration $T_p$ with a linearly ramping average frequency. Using the uncertainty relationship for the elemental pulse we find that $$\Delta t = \sqrt{\frac{T_p}{c(1/\lambda_1 - 1/\lambda_2)}} = 1.8\,\text{ps}\sqrt{\frac{T_p(\text{ns})}{(1/\lambda_1 - 1/\lambda_2)(\mu\text{m}^{-1})}} \quad (12)$$

where $T_p$ is the pulse duration in ns and $\lambda 1$ and $\lambda 2$ are the bracketing wavelengths in $\mu$m describing the chirp. For example, with $T_p$=1 ns and a 10% chirp from $\lambda_1$=500 nm to $\mu_2$=550 nm, Eq. (12) yields $\Delta t$=2.3 ps. The ratio of record length to time resolution is 3000/4=750. This is greater than the maximum ratio (~300) estimated for the phosphor screen of an electronic streak camera having a 30 mm diameter screen. For $T_p$=1 $\mu$s and the same 10% chirp as above, Eq. (12) yields $\Delta t$=135 ps and a very large record length to time resolution ratio of 7400. This record length ratio exceeds the capability of electronic streak cameras.

Interferometer designs can be organized into two classes according to the number of echoes produced from a single applied pulse. (Here, we define an echo to be any output pulse associated with an applied input pulse.) A Fabry-Perot-class (F-P) interferometer generates an infinite series of echoes, whereas the Michelson-dass generates a finite number (two). It will be shown that the number of echoes determines the number of fringing sidebands in the intensity versus velocity plot discussed below. There is also a fundamental difference in the fringe visibility and power throughput of the two classes. By increasing the partial reflectivity R of the F-P mirrors, the velocimeter fringe visibility can be increased arbitrarily at the expense of smaller throughput. This is not true of the Michelson-class, where the fringe visibility cannot exceed 50% (for a single output.) (Push-pull subtraction will always produce 100% fringe visibility.)

FIGS. 7A and 7D show these two interferometer classes, distinguished by their impulse responses. The Michelson class shown in FIG. 9A consists of a beamsplitter 30, mirror 31, and a superimposing delay, which in this case is the combination of an etalon 33 and mirror 32. Other superimposing delay designs described below can be substituted. FIGS. 9B and 9C shows that the impulse response for the Michelson class is pair of echoes separated by $\tau$.

The Fabry-Perot (F-P) class shown in FIG. 9D consists of two partially reflective mirrors 34, 35 separated by a distance $\tau/2$ and having a lens 36 placed in between mirrors 34, 35. The lens must image the surface of one mirror on to the other. The lens is crucial for the superimposing behavior. An ordinary F-P does not have this lens and is not superimposing. For the Fabry-Perot (F-P) class, the impulse response is an infinite number of echoes of geometrically decreasing amplitude, as shown in FIG. 9E.

FIG. 9C shows the power transmission spectrum for the Michelson class interferometer is sinusoidal. The F-P class power spectrum can have thinner peaks, as shown in FIG. 9F, depending on mirror partial reflectivity R.

Associated with each output pulse of the impulse response is an image of the source. The purpose of the superimposing interferometer is to superimpose these images as closely as possible, for all wavelengths and incident ray angles, while one image is delayed in terms of time-of-flight of the light. This is achieved in practice only for a limited range of wavelengths and incident angles due to ordinary and chromatic aberrations. The greater these ranges, the greater the power available for velocimetry from non-directional broadband sources such as incandescent lamps. Thus the chief design goal for a superimposing delay is to minimize aberrations for the range of wavelengths and ray angles desired.

The dispersion of glass optics affects the interferometer two ways: it chromatically smears the image position which detriments the superposition, and secondly, it causes a wavelength dependence to the time delay. The time delay smear is not a problem. However, the image position smear is a problem since it can seriously reduce the fringe visibility. Any other aberrations, chromatic or ordinary, which smear the images will detriment the superposition.

The tolerance for smear will be estimated. Let the smear be modeled by a simple displacement vector $\delta r$ of twin images seen in the beamsplitter in a Michelson design. The tolerance between the multiply displaced images of a superimposing F-P should be similar. It will be shown that the narrower the numerical aperture of the optics, the greater $\delta r$ which can be tolerated.

Let the displacement vector $\delta r$ be $$\delta r = \hat{x}\delta r_x + \hat{z}\delta r_z \quad (13)$$

with components $\delta r_x$ and $\delta r_z$ in the transverse $\hat{x}$, and longitudinal $\hat{z}$ (on-axis) directions. By comparing the distances to two point-sources on an entrance pupil from a single third point on an exit pupil, and requiring the difference in the two distances to be constant within a tolerance $\lambda/4$, it can be shown that the maximum displacements in the longitudinal and transverse directions must be less than $$\delta r_z < \frac{\lambda}{2}\frac{1}{\theta^2} \quad (14)$$

and $$\delta r_x < \frac{\lambda}{8}\frac{1}{\theta} \quad (15)$$

where $\theta$ is an angle which characterizes the numerical aperture subtended between the entrance and exit pupils, whichever numerical aperture is larger.

Equations (14) and (15) can be used in reverse, to solve for the range of angles q from an illumination source which produce visible fringes (and therefore suitable for velocimetry) for a known displacement between twin images in the interferometer. The displacement vector dr would be caused either by aberrations, or by use of a non-superposing interferometer.

For example, this can be used to show the disadvantages of a non-superimposing interferometer. A non-superimposing interferometer will not be able to utilize the full power available from a non-directional broadband source such as an incandescent lamp. Either the bandwidth will be limited for all ray angles, or the ray angles will be limited for all bandwidth. An example of this is the non-superimposing double Fabry-Perot of Patent 4,915,499. In the former case, the patent authors calculated in their aforementioned Applied Optics article that their bandwidth was limited to <4 nm when the interferometer is used to measure off-axis fringes, (and therefore involving a large range of ray angles.) In the latter case, which is when on-axis fringes are measured, by using Equation (14) where $dr_z$ is the mirror spacing of several cm, it can be seen that the range of acceptable angles is very small, of the order q~0.002 radian. Thus the only a superimposing interferometer (and thus $dr_z\_0$) will simultaneously allow a large range of angles and large bandwidth, and therefore utilize the full power available from a non-directional wide bandwidth source.

Two kinds of interferometers will be discussed: superimposing Fabry-Perots, and Michelsons incorporating superimposing delays.

Figure 10A:
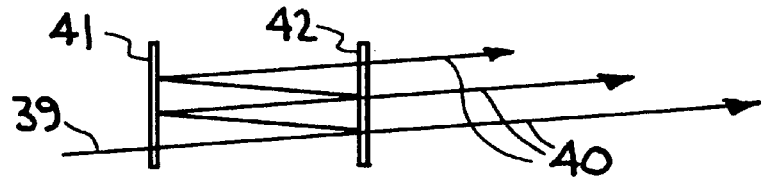
FIG. 10A illustrates the nonsuperimposing Fabry-Perot interferometer.

The classical Fabry-Perot (F-P) interferometer is not superimposing and therefore cannot work with broadband illumination. The reason it is not superimposing is illustrated in FIG. 10A. An off-axis entrance ray 39 zigzags between the mirrors 41 and 42, producing output rays 40 that are successively translated transversely, for each round trip. To be superimposing, the output rays must share the same path, for all round trips. For the classical F-P, this only occurs for the on-axis ray.

Figure 10B:
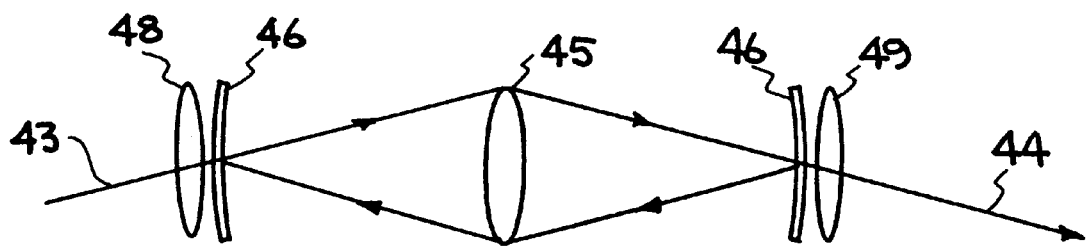
FIG. 10B illustrates a superimposing Fabry-Perot.

In a superimposing Fabry-Perot, shown in FIG. 10B, echoes for all the round trips exit along the same output ray 44, for each incident ray 43. This condition is satisfied for any incident ray angle, not limited to the on-axis rays as in the classical F-P. Thus, the temporal characteristics of the superimposing F-P is the same as the on-axis classical F-P.

The superimposing F-P is achieved by a lens 45 between two partially reflecting spherical mirrors 46 and 47, such that exactly +1 magnification is achieved per round trip. This is achieved when the surface of mirror 46 is imaged to the surface mirror 47 by the lens 45. The radii of curvature of the spherical mirrors are centered at lens 45. Lenses 48 and 49 allow a collimated beam to pass as collimated. The interferometer will be achromatic if an achromatic lens 45 is used.

Superimposing delays which can be incorporated into one arm of a Michelson interferometers will now be described. Generally, a superimposing delay should act like a plane mirror in terms of how the output ray directions behave, but yet delay the light in time. The created mirror will be called the "effective" mirror. (The term "virtual" is avoided here to prevent confusion with the term virtual imaging, used below to classify the lens arrangement.) The mirror of the other interferometer arm is positioned to superimpose with this effective mirror position, thus creating a delay while satisfying the superposition condition.

Figure 10C:
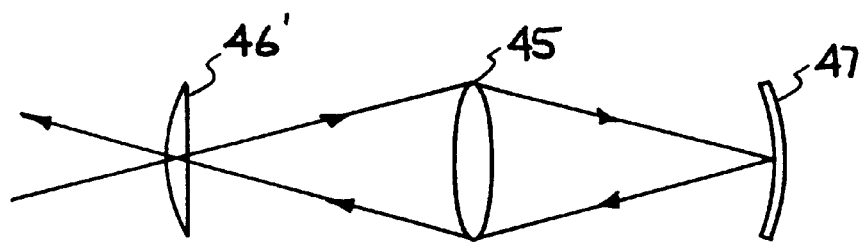
FIG. 10C shows a superimposing Fabry-Perot having no entrance mirror and a totally reflective exit mirror.
Figure 10D:
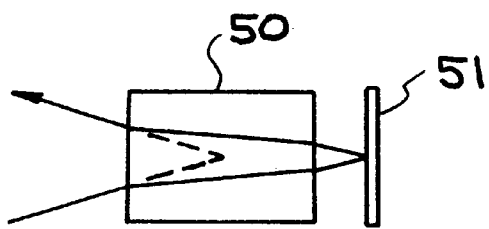
FIG. 10D illustrates a pulse that is delayed by the slower speed of light through glass.

The simplest superimposing delay is the etalon delay. FIG. 10D shows how due to refraction the mirror 51 behind the glass slab 50 appears closer to the slab, yet a pulse is delayed by the slower speed of light through the glass. The etalon delay is used in conventional laser-illuminated VISAR velocimeters, as shown in FIG. 9A. The advantage of the etalon is its simplicity of alignment. However, the etalon delay suffers chromatic aberration because of dispersion in the glass. Thus it can only be used in the white light velocimeter for high collimated light, or for sufficiently small delays such as for high velocity measurements.

The other superimposing delays described below are achromatic. The achromatism comes from the use of individually achromatic lenses and mirrors, or the matching of elements having opposite chromatisms. Except where noted, the mirrors are assumed to be first surface reflectors and therefore achromatic. To avoid duplication, the drawings will chiefly show the use of transmissive optics. However, it is implied that reflective optics could optionally be substituted with minor rearrangement of positions to enhance the achromatic quality or reduce cost.

The delay designs can be classified according to whether real or virtual imaging is used between a lens and a mirror. This strictly depends on the lens-mirror distance compared to the focal length.

A relay lens delay is a superimposing delay using real imaging related to the superimposing F-P. Referring to FIG. 10C, the relay lens delay is obtained from the superimposing F-P optics, by making the exit mirror 47 totally reflective and removing the entrance mirror. Lens 45 images the mirror 47 surface to the plane at lens 46'. The focal point of lens 46' is at lens 45, and the center of curvature of mirror 47 is at lens 45. These two arrangements allow a collimated beam to pass through the delay as collimated. The optics as a unit act as a plane mirror superimposed at the position of lens 46', and yet it takes light a finite time to traverse the unit. Lenses 45 and 46' should be achromatic to produce an achromatic delay.

Figure 11:
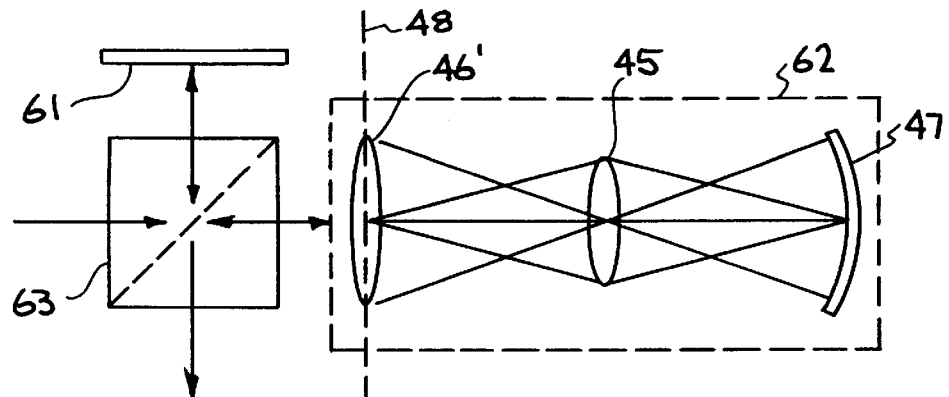
FIG. 11 shows how delay is used in one arm of a Michelson interferometer.

FIG. 11 shows how this delay is used in one arm of a Michelson interferometer, as the group of elements enclosed in the dashed box 62 form an effective plane mirror at 48. The mirror of the other arm 61 is superimposed by beamsplitter 63 at this plane 48. To implement a meter scale delay having f/10 optics, the internal lens 45 can be implemented by a spherical mirror 65, shown in FIG. 12, which shows a complete velocimeter including source 10, target 69 and detecting telescope or camera 70. Lens 50 images the target 69 to the interferometer mirror planes 48 and 61. The purpose of this is discussed later. The optics enclosed by the dashed box 62 form an effective plane mirror at 48. The pick-off mirror 66 is needed so that lens 46' and mirror 47 are the same distance from mirror 65. To minimize astigmatism due to off-axis reflection from the spherical mirror 65, the rays 68 should pass closely to the pick-off mirror 66. On the other hand, the size of the image of the target at plane 48, which is also the size of the image at mirror 47, limits the rays 68 from coming very dose to mirror 66. Thus there is a compromise between astigmatism and image size.

Figure 13A:
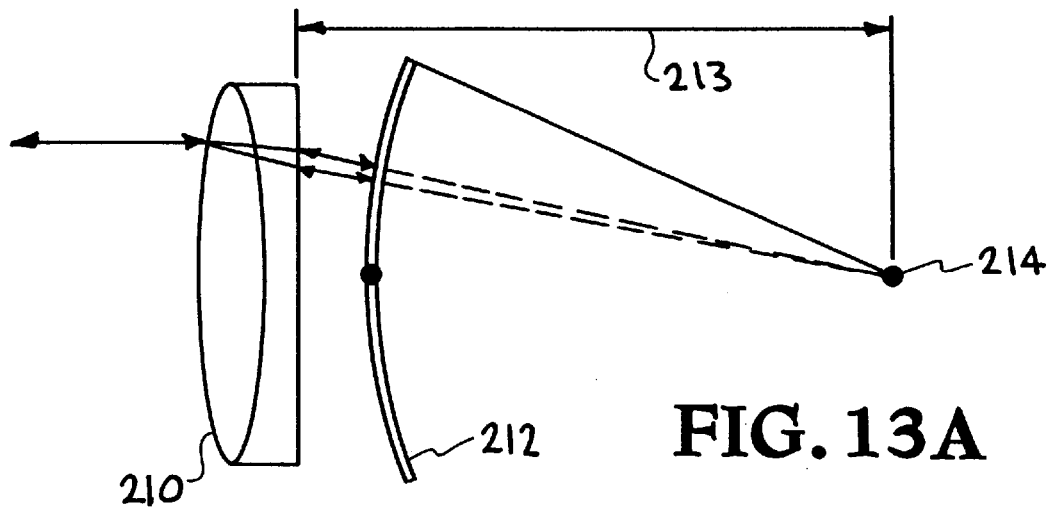
FIG. 13A shows a virtual imaging delay using a combination of an achromatic transmissive lens and a front surface spherical mirror.
Figure 13B:
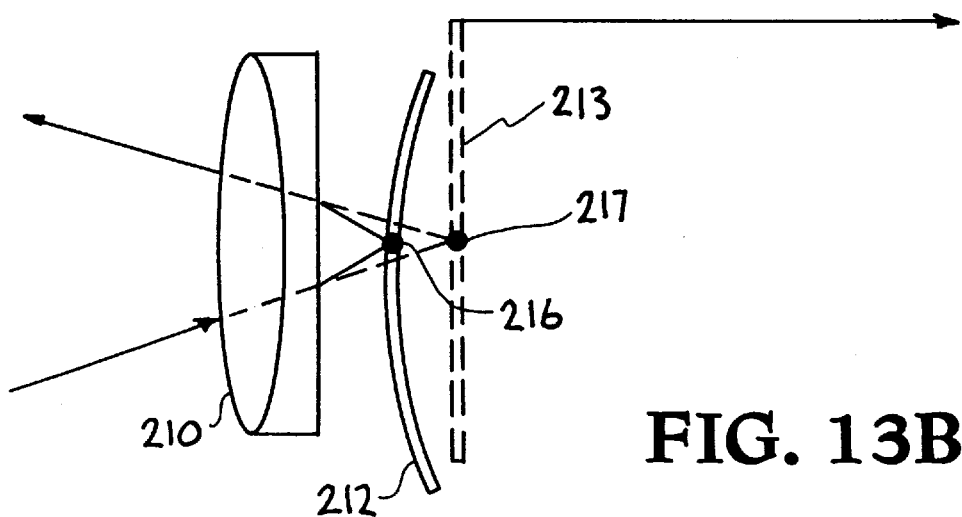
FIG. 13B shows the surface of a mirror imaged by a lens to a fixed position.
Figure 13C:
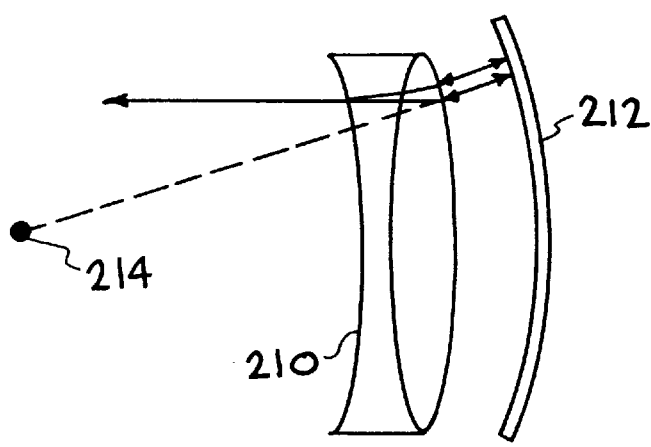
FIG. 13C shows the use of a negative lens and a concave mirror.

FIG. 13A shows a virtual imaging delay using a combination of an achromatic transmissive lens 210 and an front surface spherical mirror 212 (which is achromatic). In this design, lens 210 and mirror 212 are separated by a distance less than the lens's focal length F (213), hence, virtual imaging is involved. If the lens is positive, the mirror is convex as in FIG. 13A; if the lens is negative, the mirror is concave as in FIG. 13C.

FIG. 13A and 11C, the focal point of lens 210 is arranged to be at the mirror center of curvature 214 so that the lens 210 images point 214 infinitely far way. For the case of a positive lens 210 in FIG. 13B, the surface of the mirror at point 216 is imaged by lens 210 to a position 217. Thus, the effective image of mirror 212 is a plane mirror 213 at a position 217. Similarly for the case of a negative lens 210.

Figure 14A:
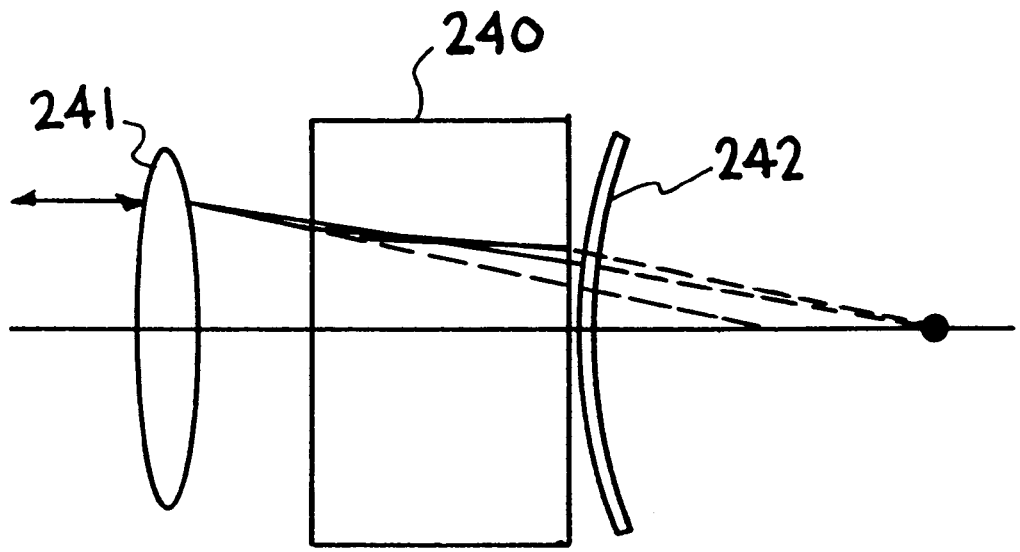
FIG. 14A shows the use of an etalon to reduce or zero the net aberration of the combination lens-etalon.

In FIG. 14, if an etalon 240 is placed in between the lens 241 and the reflector 242, the chromatic aberration introduced by the etalon is of opposite polarity as that of a simple lens and therefore can reduce or zero the net aberration of the combination lens-etalon. The rays drawn in FIG. 14A are drawn for blue and red and the dispersive quality of the etalon is greatly exaggerated. The rays are drawn as if the refractive index for red is 1 (i.e., no refraction) and for blue much larger than 1 (much refraction). An object behind a slab of glass always appears closer to the observer. Since the refractive index is greater for blue than red, the mirror center of curvature 244 will appear closer to the lens for blue rays than red rays. This may help compensate the chromatic aberration of a simple uncorrected lens 241, since that lens will focus the blue closer to lens 241 than for red. Thus, the apparent mirror center of curvature will remain at the focal point of the lens for both blue and red.

Figure 14B:
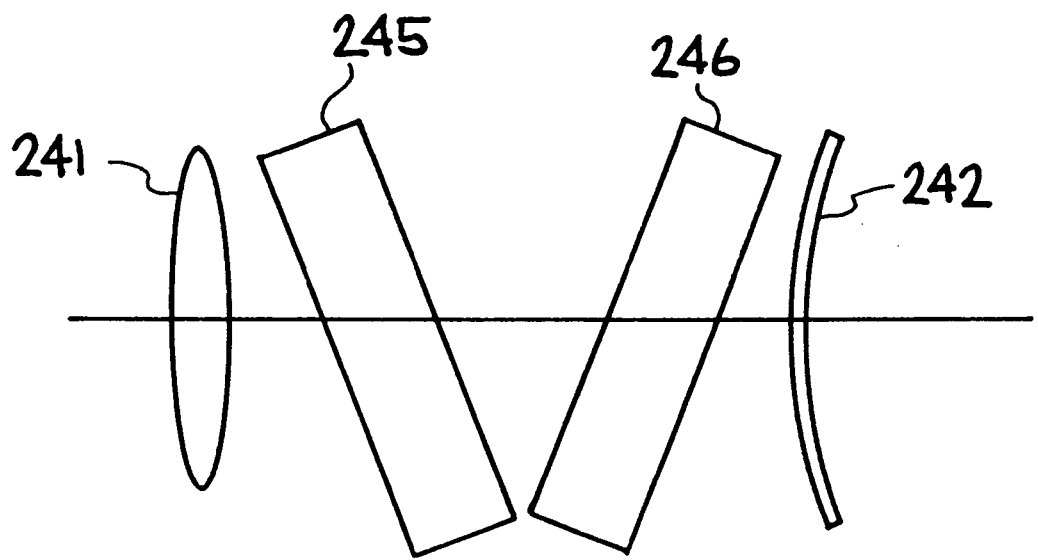
FIG. 14B shows that tilting glass etalons can adjust the amount of chromatic aberration contributed by the etalons.

FIG. 14B shows that tilting glass etalons 245 and 246 can adjust the amount of chromatic aberration contributed by the etalons, so that the net amount for the combination lens-etalons can be zeroed. A pair, instead of a single etalon, may be used to prevent introduction of other aberrations. One may need an additional pair of tilted etalons (not shown) tilted in an orthogonal direction (out of the plane of the Figure) to avoid astigmatism.

The introduced delay can be positive or negative depending on the total glass thickness in the delay, and the position of the effective mirror 242'. In practice, only the magnitude of the delay is relevant, since moving the delay to the other arm will flip the polarity, or swapping interferometer outputs will have the same effect.

Figure 15A:
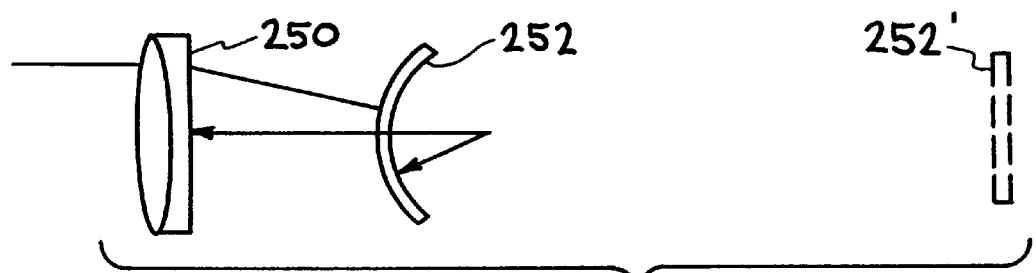
FIG. 15A illustrates the use of a thin achromat and a small radius of curvature mirror to create a large negative delay.
Figure 15B:
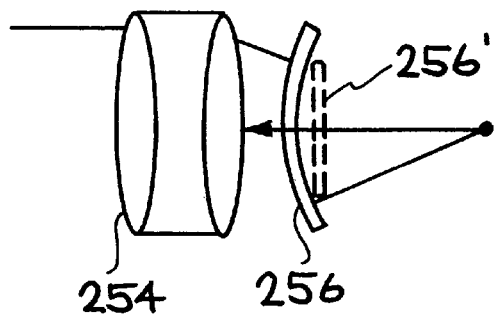
FIG. 15B illustrates the use of a thick achromat and a large radius of curvature mirror to create a positive delay.
Figure 15C:
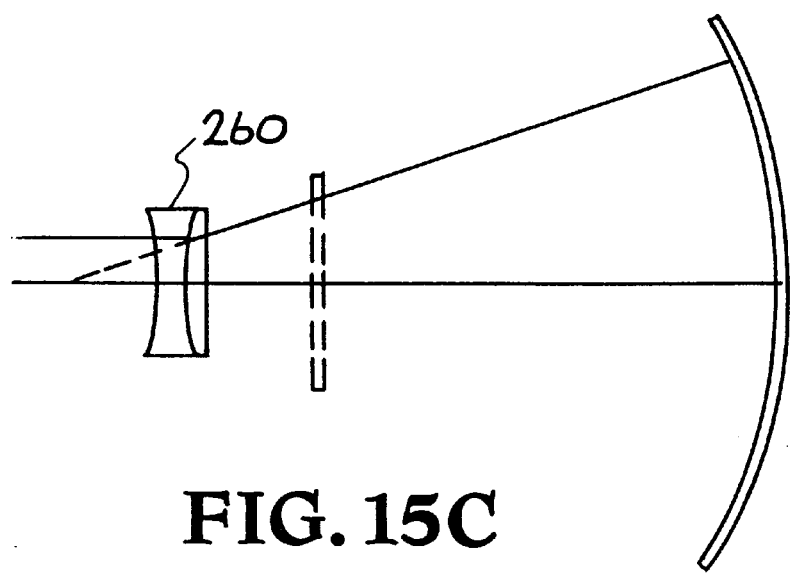
FIG. 15C shows a design with a negative lens that achieves a wider angle of acceptance then 13A for the same large delay.

In FIG. 15A, a thin achromat 250 and small radius of curvature mirror 252 create a large negative delay, since a photon traveling through the combination will appear sooner than a photon traveling to the apparent mirror and back. This is because the apparent mirror 252' is far to the right, and the amount of glass small. In FIG. 15B, a thick achromat 254 and large radius of curvature mirror 256 create a positive delay. A photon traveling through the combination will emerge later than one traveling to the apparent mirror 256', because the light travels slower through glass and the apparent mirror is close. FIG. 15C shows a design with a negative lens 260 that achieves a wider angle of acceptance then 13A for the same large delay.

Figure 16:
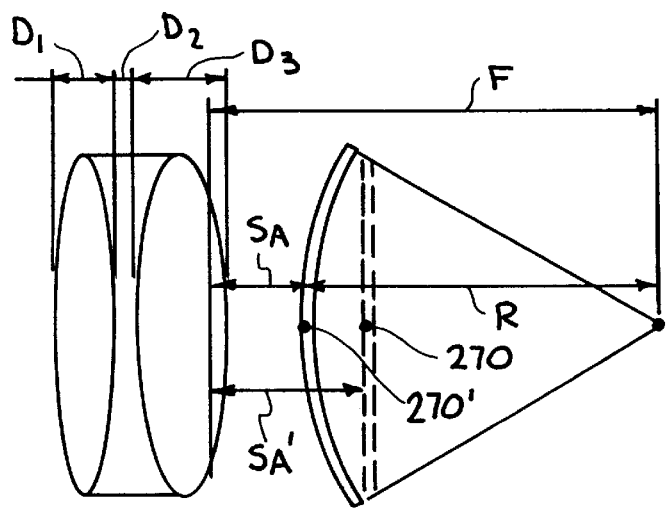
FIG. 16 illustrates the variables used to compute net delay.

FIG. 16 illustrates the variables used to compute the net delay. We must have $F=R+S_a$ in order for the apparent mirror to be plane (have infinite radii of curvature.) The delay is the sum of two components: delay due to the slower speed through the glass, and delay due to the change in distance between actual 270 and apparent 270' mirror positions. Let the former delay be called $\tau_{glass}$ and the latter $\tau_{mirror}$.

The insertion delay of a glass element of thickness D is (n-1)D, where n is the refractive index. Each piece of glass contributes a delay, so to sum over all the elements $$\tau_{glass}=\Sigma D_i(n_i-1) \quad (16)$$

where $n_i$ and $D_i$ are the refractive index and thickness at the axis of each element of a compound lens.

The apparent mirror distance is computed from the lens law. Let the distance from the lens' principal plane to the mirror surface at the axis be $S_a$, and to the imaged mirror surface $S_a'$. Thus $$1/S_a'=1/S_a-1/F \quad (17)$$

Equation (17) was written so that $S_a'$ is a positive quantity. Then $$\tau_{mirror} = S_a' - S_a = \frac{1}{1/S_a + 1/F} - S_a. \quad (18)$$

The net delay is $$\tau=\tau_{glass}-\tau_{mirror} \quad (19)$$

By using telescope mirrors, achromatic superimposing delays of the order several meters long can be constructed, having reasonable large numerical apertures. However, larger delays would require prohibitively large mirrors to maintain the same numerical aperture. One solution is to use single mode fiber optics to create a delay. The delay is superimposing since it only supports one ray direction. Unfortunately, this precludes imaging velocimeters, which are desirable.

Figure 17:
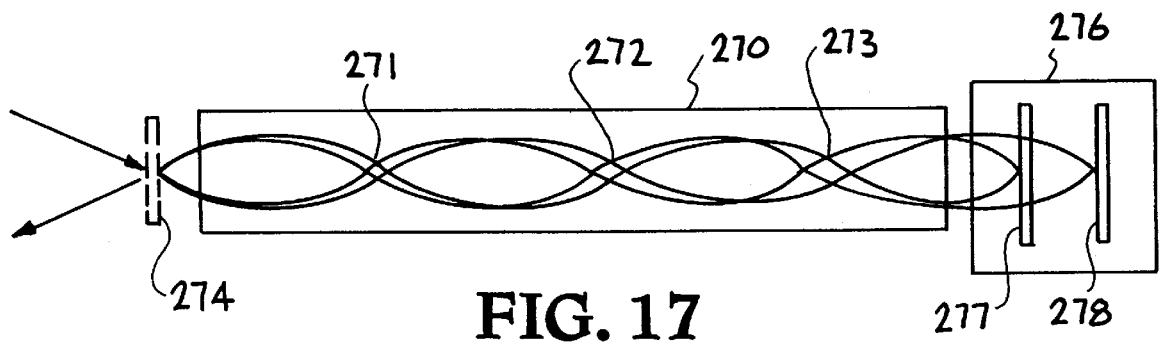
FIG. 17 shows the use of an imaging optical waveguide.

Another solution is to use an imaging optical wave guide, shown in FIG. 17. This consists of a thick (several mm) "fiber" 270 with a refractive index that decreases approximately as the radius squared. In such a wave guide, real images are formed periodically (271, 272, and 273) at specific distances along the fiber, as shown in FIG. 17, similar to a relay chain of positive lenses. These wave guides are commercially available. If a single mirror is placed at the end of the fiber, the mirror is imaged to the front neighborhood 274 of the fiber and thus forms a superimposing delay for monochromatic light. The glass dispersion prevents its use with broadbanded light with a single mirror.

To use the wave guide fiber for broadband light a distributed mirror 276 is needed, where the mirror position for each color (277 for blue, 278 for red) is different so that the image of the mirror at the front of the fiber 274 is superimposed for all colors. The distributed mirror would have a large thickness, of the order $(n_{blue}-n_{red})D$, where $n_{blue,red}$ are the refractive indices at the center of the fiber for blue and red light, and D is the fiber length. For typical glass, $(n_{blue}-n_{red})$ is of the order one percent. Thus for example, if the fiber is 10 meters long, the distributed mirror will be approximately 10 cm.

A distributed mirror could be constructed of a volume hologram. This operates on the principle that a transparent material which has a refractive index which varies sinusoidally will strongly reflect light of the wavelength matching the periodicity of the sinusoidal variation. Standard holographic techniques can be used to construct the hologram such that the effective position of the reflector varies in depth with color.

Figure 12:
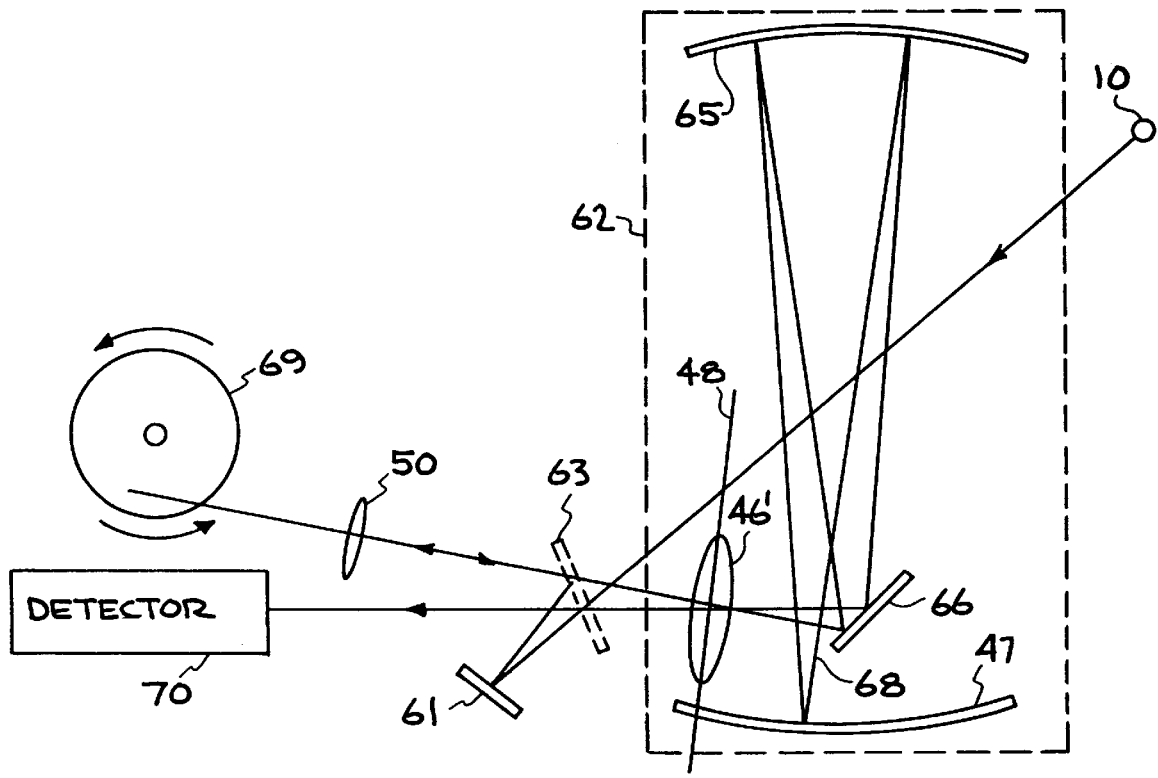
FIG. 12 shows an embodiment of a complete velocimeter.

In all realistic superimposing delay designs, some aberrations are inevitable and these will cause the effective mirror of the delay to have a slight curvature, instead of being ideally plane. When the plane mirror of the non-delayed interferometer arm and effective mirror are superimposed by the interferometer beamsplitter, any curvature of the effective mirror can detriment fringe visibility. Such a detriment can be significantly reduced if the target is imaged close to the mirror planes, and not in front or behind it. In FIG. 12, this is accomplished by the lens 50. The improvement in fringe visibility by the use of this lens can be dramatic.

Figure 18A:
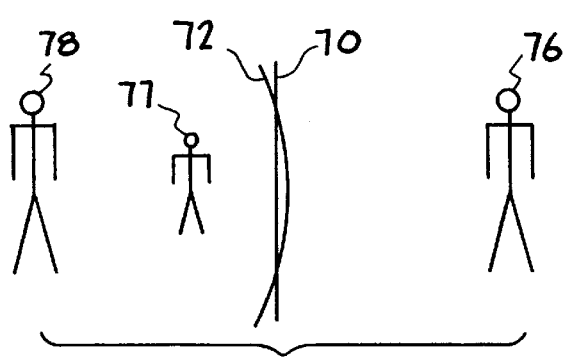
FIGS. 18A and 18B illustrate why imaging the target to the interferometer mirror plane improves image superposition for aberrated optics.
Figure 18B:
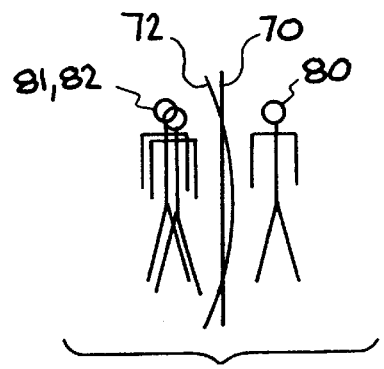

FIG. 18A illustrates why imaging the target to the interferometer mirror plane improves image superposition for aberrated optics. The effective mirror positions of the two arms of the detecting interferometer, delayed and non-delayed, are located at 70 and 72 after being superimposed by the beamsplitter. Suppose the effective mirror at position 72 has curvature due to distortions. Suppose also that a lens images the target to position 76 far from mirror positions 70 and 72. Then any mirror curvature greatly changes the magnification of one reflection 77 of the target image compared to the other 78. This increases the displacement vector δr between the twin images, which needs to be minimized to achieve visible fringes. However, if the target is imaged to position 80 (FIG. 18B) near the mirror surfaces, no change in magnification is produced between its twin reflections 81 and 82.

The delays and interferometers discussed have manipulated waves such as light traveling as rays in more than one spatial dimension. The same 3-dimensional configurations of lenses and reflectors can apply directly to other directional waves, such as sound and microwaves, provided the size of the elements is appropriately large so that diffraction of the waves is not serious. If the element size is small compared to the wavelength so the diffraction is relevant, then the shape of the elements may be slightly different.

If the wave travels along only one path (single-mode propagation), instead of a manifold of paths, then the superimposing requirement is moot. For example for microwaves and sound, an antenna or transducer can sample the 2 or 3-dimensional wavefield and produce a time-varying voltage. The voltage wave then propagates along an electrical cable in a single mode. A lens focusing light onto a single-mode optical fiber is another example.

For a single-mode wave, the superimposing interferometer simply consists of delaying a portion of the wave, and then recombining it. For an electrical wave, this can be implemented by analog delay lines, or done digitally after the voltage is converted to a number by an analog/digital converter. For a single-mode optical fiber, the interferometer can be implemented by fiber loops using appropriate single mode couplers acting as beamsplitters. These 1-D interferometers cannot form prompt imaging velocimeters. However, by scanning the beam from the antenna or transducer, an image can be constructed over time.

A single-mode fiber-optic interferometer can have enormous delay lengths not practical by use of open-air optics. This creates cm/s velocity sensitivity. In order to automatically compensate for fluctuations in fiber length due to temperature and physical vibrations, the reflected light from the target could be retro-reflected so that the source and detecting interferometers are implemented by the same fiber.

FIG. 12 shows the apparatus of a demonstration white light velocimeter measuring a 16 m/s target using ordinary incandescent light. The color fringe output of it is shown in FIG. 6A and 6B for stationary and moving target, respectively. A single Michelson interferometer with a superimposing relay lens delay (the optics in the dashed box 62) is used. By using the retro-reflected light from the target, the single interferometer accomplishes both source and detecting interferometer functions. This simplifies alignment and automatically insures the source and detecting delays match closely.

In order to measure the 16 m/s speed, the velocity per fringe coefficient was arranged to be η≈19 m/s per fringe, by a delay of cτ=4 m. This delay is notably longer than that of a typical VISAR, which commonly has delays of only a few centimeters. Lens 50 images the target 64 to the interferometer mirror planes. This is important for good fringe visibility, since the effective mirror suffers some astigmatic distortion due to the off-axis reflection from the spherical mirror 52. The illumination source 10 was a 10× microscope objective collimating the output of a 600 μm diameter fiber illuminated by a incandescent lamp. The target 69 is a fan with reflective tape on its blades, and a telescope or camera 70 is placed to receive the exit light traveling from beamsplitter 63. Mirrors 61 and 66 are plane mirrors, and mirrors 65 and 47 have a 1 m radius of curvature and are separated 1 m. Lens 46' is a 1 m focal length lens. The other interferometer output (not used here) travels toward the source and is accessible by inserting a beamsplitter between beamsplitter 63 and source 10.

FIGS. 6A and 6B show the fringe output of the interferometer. The beamsplitter or interferometer mirror is slightly tilted to create a comb of fringes, so that the delay difference $\tau_s - \tau_d$ varies transversely across the film record. The figures compares the fringes obtained for the stationary target to the fringes of the target moving at 16 m/s. The white arrows indicate the central fringe of the pattern. A shift in the fringe pattern is observed that is proportional to the target velocity.

The velocity is determined from the shift measured in terms of fringe spacing, which in turn depends on color. All of the colors are present and each create a fringe comb. Any of them can be used for the velocity determination. Observing through a 500 nm bandpass filter, a shift of Δϕ=0.85±0.07 fringe was observed. For λ=500 nm, η=18.7 m/s from Eq. (2), a interferometrically measured velocity of 15.9±1 m/s was measured. A stroboscope measuring rotational frequency, and measurement of the range of radii which the beam intercepted the blade yielded a velocity component toward the velocimeter of 15.7±0.3 m/s.

This demonstration measured the target velocity averaged over an area defined by the illuminating beam cross-section on the target, because the camera was greatly defocused. To create a velocity image of the target, rather than measuring a single value velocity, the camera would be nearly focused, forming an image of the target on the film plane. In this case the beamsplitter or mirrors should not be tilted to produce a fringe comb, because the fringe phase is desired to be uniform over the image for a stationary target, and this requires aligned mirrors. The camera should not be perfectly focused unless the interferometer is perfectly aberrationless. Given that there is inevitably some displacement $\delta r_2$ between the twin images of the target on the film plane, the camera must be defocused enough that the focal blur exceeds $\delta r_2$, so that the two separate focal spots associated with pixels from each target twin image overlap.

Changes and modifications in the specifically described embodiments can be carried out without departing from the scope of the invention, which is intended to be limited by the scope of the appended claims.

The invention claimed is:

1. A method of imprinting at least one coherent echo on a beam, comprising:
   directing a beam onto a mirror;
   creating an apparent mirror by imaging said mirror, wherein the imaged surface of said mirror defines the location of said apparent mirror, wherein the imaged center of curvature of said mirror defines the center of curvature of said apparent mirror;
   providing a second mirror having about the same curvature as said apparent mirror; and
   superimposing the location of said second mirror with the location of said apparent mirror.

2. The method of claim 1, wherein said apparent mirror can be slightly tilted from perfect overlap in order to create a delay time which varies with position across the plane of said apparent mirror, wherein said beam can be any wave kind which travels in 2 or 3 dimensions.

3. The method of claim 2, wherein said wave kind comprises electromagnetic waves selected from a group consisting of microwaves, visible light, infrared light, ultraviolet light and x-rays.

4. The method of claim 2, wherein said wave kind comprises sound waves.

5. The method of claim 1, wherein said beam is uncollimated, wherein said beam comprises a range of ray angles significant enough to prevent a coherent delay if said beam were to propagate in free space over a distance about equal to the distance between said apparent mirror and said mirror.

6. The method of claim 1, wherein said imaging is real imaging, wherein said real imaging is accomplished using at least one elements selected from a group consisting of lenses, curved mirrors, plane mirrors, distributed mirrors and waveguides.

7. The method of claim 6, wherein said real imaging is accomplished using at least one transmissive lens and said mirror.

8. The method of claim 7, wherein said mirror comprises a curved mirror.

9. The method of claim 6, wherein said mirror comprises a plane mirror in combination with a lens which together effectively act as a curved mirror.

10. The method of claim 6, wherein said real imaging is accomplished by a transmissive lens, at least one center curved mirror and said mirror.

11. The method of claim 10, wherein said mirror comprises a curved mirror.

12. The method of claim 10, wherein said mirror comprises a plane mirror in combination with a lens which together effectively act as a curved mirror.

13. The method of claim 1, wherein said apparent mirror is formed with achromatic optics.

14. The method of claim 1, wherein said apparent mirror is formed with a plurality of optical elements, wherein at least one optical element of said plurality of optical elements comprise a distributed mirror comprising an effective reflective surface depth that is a function of wavelength.

15. The method of claim 14, wherein said effective reflective surface depth wavelength dependence compensates for chromatic dispersion of said plurality of optical elements so that the net chromatic aberration of said apparent mirror is reduced.

16. The method of claim 1, wherein said imaging is virtual imaging, wherein said virtual imaging is accomplished using lenses and a curved mirror.

17. A method of imprinting an infinite series of diminishing amplitude coherent echoes on a beam, comprising:
    directing a beam of light onto a mirror;
    creating an apparent mirror by imaging said mirror, which may be partially transmitting;
    providing a second mirror having about the same curvature and curvature polarity as said apparent mirror, wherein said second mirror may be partially transparent;
    superimposing said second mirror with said apparent mirror so that a recirculating path is created having a magnification of positive unity for a roundtrip along the optic axis, wherein said roundtrip is from said first mirror to said second mirror then back to said first mirror;
    introducing said beam to said recirculating path by partial transmission through a partially reflecting surface; and
    extracting a portion of said beam from said recirculating path through a partially transmitting surface, wherein the roundtrip travel time along said recirculating path determines an interferometer delay time, wherein said portion comprises an infinite series of diminishing amplitude coherent echoes.

18. The method of claim 17, wherein said beam is uncollimated, wherein said beam comprises a range of ray angles significant enough to prevent a coherent delay if said beam were to propagate in free space over a distance about equal to the distance between said apparent mirror and said first mirror.

19. The method of claim 17, wherein said imaging is real imaging, wherein said real imaging is accomplished using at least one element selected from a group consisting of lenses, curved mirrors, plane mirrors, distributed mirrors and waveguides.

20. The method of claim 19, wherein said real imaging is accomplished by at least one lens and said mirror.

21. The method of claim 20, wherein said mirror comprises a curved mirror.

22. The method of claim 20, wherein said mirror comprises a plane mirror in combination with a lens which together effectively act as a curved mirror.

23. The method of claim 20, wherein said real imaging is accomplished using at least one curved mirror and said mirror.

24. The method of claim 23, wherein said mirror comprises a curved mirror.

25. The method of claim 23, wherein said mirror comprises a plane mirror in combination with a lens which together effectively act as a curved mirror.

26. A method of coherently delaying a beam, comprising;
    directing a beam of light onto a mirror;
    creating an apparent mirror by imaging said mirror, wherein the imaged surface of said mirror defines the location of said apparent mirror, wherein the imaged center of curvature of said mirror defines the center of curvature of said apparent mirror; and
    reflecting said beam off said apparent mirror, wherein said beam is delayed by the interval of round trip travel between said apparent mirror and said mirror and back to said apparent mirror, wherein said beam can be any wave kind which travels in 2 or 3 dimensions.

27. The method of claim 26, wherein said wave kind is visible light.

28. The method of claim 26, wherein said wave kind comprises electromagnetic waves selected from a group consisting of microwaves, visible light, infrared light, ultraviolet light and x-rays.

29. The method of claim 26, wherein said wave kind comprises sound waves.

30. The method of claim 26, wherein said wave kind comprises matter waves.

31. The method of claim 26, wherein said beam is uncollimated, wherein said beam comprises a range of ray angles significant enough to prevent a coherent delay if said beam were to propagate in free space over a distance about equal to the distance between said apparent mirror and said mirror.

32. The method of claim 26, wherein said real imaging is accomplished using at least one element selected from a group consisting of lenses, curved mirrors, plane mirrors, distributed mirrors and waveguides.

33. The method of claim 32, wherein said imaging is real imaging, wherein said real imaging is accomplished with at least one lens and said mirror.

34. The method of claim 33, wherein said mirror comprises a curved mirror.

35. The method of claim 33, wherein said mirror comprises a plane mirror in combination with a lens which together effectively act as a curved mirror.

36. The method of claim 32, wherein said imaging is real imaging, wherein said real imaging is accomplished with a transmissive lens, at least one center curved mirror and said mirror.

37. The method of claim 36, wherein said mirror comprises a curved mirror.

38. The method of claim 36, comprises a plane mirror in combination with a lens which together effectively act as a curved mirror.

39. The method of claim 26, wherein said apparent mirror is formed with achromatic optics.

40. The method of claim 26, wherein said apparent mirror is formed with a plurality of optical elements, wherein at least one optical element of said plurality of optical elements comprises a distributed mirror whose effective reflective surface depth is a function of wavelength.

41. The method of claim Wherein the wavelength dependence of said effective reflective surface depth compensates for chromatic dispersion of other elements forming said apparent mirror so that the net chromatic aberrations of said apparent mirror is reduced.

42. The method of claim 26, wherein said virtual imaging is accomplished by a lens and a curved mirror.

43. An apparatus for imprinting at least one coherent echo on a beam, comprising:
   directing a beam onto a mirror;
   means for creating an apparent mirror by imaging said mirror, wherein the imaged surface of said mirror defines the location of said apparent mirror, wherein the imaged center of curvature of said mirror defines the center of curvature of said apparent mirror;
   providing a second mirror having about the same curvature as said apparent mirror; and
   superimposing the location of said second mirror with the location of said apparent mirror.

44. The apparatus of claim 43, wherein said beam comprises a wave kind comprising light.

45. The apparatus of claim 43, wherein said beam comprises a wave kind comprising electromagnetic waves selected from a group consisting of microwaves, visible light, infrared light, ultraviolet light and x-rays.

46. The apparatus of claim 43, wherein said beam comprises a wave kind comprising sound waves.

47. The apparatus of claim 43, wherein said beam is uncollimated, which is to say that there is a range of ray angles significant enough to prevent a coherent delay if said beam were to propagate in free space over a distance about equal to the distance between said apparent mirror and said mirror.

48. The apparatus of claim 43, wherein said imaging is real imaging, wherein said real imaging is accomplished using at least one element selected from a group consisting of lenses, curved mirrors, plane mirrors, distributed mirrors and waveguides.

49. The apparatus of claim 48, wherein said real imaging is accomplished by one or more transmissive lenses and said mirror.

50. The apparatus of claim 49, wherein said mirror comprises a curved mirror.

51. The apparatus of claim 49, wherein said mirror comprises a plane mirror in combination with a lens which together effectively act as a curved mirror.

52. The apparatus of claim 48, wherein said real imaging is accomplished by a transmissive lens, at least one center curved mirror and said mirror.

53. The apparatus of claim 52, wherein said mirror comprises a curved mirror.

54. The apparatus of claim 52, wherein said mirror comprises a plane mirror in combination with a lens which together effectively act as a curved mirror.

55. The apparatus of claim 43, wherein said apparent mirror is formed with achromatic optics.

56. The apparatus of 43, wherein said apparent mirror is formed with a plurality of optical elements, wherein at least one optical element of said plurality of optical elements comprises a distributed mirror whose effective reflective surface depth is a function of wavelength.

57. The apparatus of 56, wherein the wavelength dependence of said effective reflective surface depth compensates for chromatic dispersion of said plurality of optical elements forming said apparent mirror so that the net chromatic aberrations of said apparent mirror are reduced.

58. The apparatus of claim 43, wherein imaging is virtual imaging, wherein said virtual imaging is accomplished by one or more lenses and a curved said mirror.

59. An apparatus for imprinting an infinite series of diminishing amplitude coherent echoes on a beam, comprising:
   directing a beam onto a mirror;
   means for creating an apparent mirror by imaging said mirror, which may be partially transmitting;
   a second mirror having the same curvature and curvature polarity as said apparent mirror, wherein said second mirror may be partially transparent, wherein said second mirror is superimposed with said apparent mirror so that a recirculating path is created having a magnification of positive unity for a roundtrip along the optic axis, wherein said roundtrip is from said first mirror to said second mirror then back to said first said mirror;
   a partially reflecting/transmitting surface through which said beam can be introduced into said recirculating path;
   a partially reflecting/transmitting surface through which a portion of said beam from said recirculating path can be extracted, wherein an interferometer delay time is determined by the roundtrip travel time along said recirculating path.

60. The apparatus of claim 59, wherein said beam is uncollimated, wherein said beam comprises a range of ray angles significant enough to prevent a coherent delay if said beam were to propagate in free space over a distance about equal to the distance between said apparent mirror and said first mirror.

61. The apparatus of claim 59, wherein said imaging is real imaging, wherein said real imaging is accomplished using at least one element selected from a group consisting of lenses, curved mirrors, plane mirrors, distributed mirrors and waveguides.

62. The apparatus of claim 61, wherein said real imaging is accomplished by at least one lens and said mirror.

63. The apparatus of claim 62, wherein said mirror comprises a curved mirror.

64. The apparatus of claim 62, wherein said mirror comprises a plane mirror in combination with a lens which together effectively act as a curved mirror.

65. The apparatus of claim 62, wherein said real imaging is accomplished using one or more curved mirrors and said mirror.

66. The apparatus of claim 65, wherein said mirror comprises a curved mirror.

67. The apparatus of claim 65, wherein said mirror comprises a plane mirror in combination with a lens which together effectively act as a curved mirror.

68. An apparatus for coherently delaying a beam, comprising;
   a mirror;
   means for directing a beam onto said mirror; and
   means for creating an apparent mirror by imaging said mirror, wherein the imaged surface of said mirror defines the location of said apparent mirror, wherein the imaged center of curvature of said mirror defines the center of curvature of said apparent mirror, wherein said beam is reflected off said apparent mirror, wherein the beam is delayed by the interval of round trip travel between said apparent mirror and said mirror and back to said apparent mirror, wherein the beam can be any wave kind which travels in 2 or 3 dimensions.

69. The apparatus of claim 68, wherein said beam comprises a wave kind comprising visible light.

70. The apparatus of claim 68, wherein said beam comprises a wave kind comprising electromagnetic waves selected from a group consisting of microwaves, visible light, infrared light, ultraviolet light and x-rays.

71. The apparatus of claim 68, wherein said beam comprises a wave kind comprising sound waves.

72. The apparatus of claim 68, wherein said beam comprises a wave kind comprising matter waves.

73. The apparatus of claim 68, wherein said beam is uncollimated, wherein said beam comprises a range of ray angles significant enough to prevent a coherent delay if said beam were to propagate in free space over a distance about equal to the distance between said apparent mirror and said mirror.

74. The apparatus of claim 68, wherein said imaging is real imaging, wherein said real imaging is accomplished using at least one element selected from a group consisting of lenses, curved mirrors, plane mirrors, distributed mirrors and waveguides.

75. The apparatus of claim 74, wherein said real imaging is accomplished by at least one lens and said mirror.

76. The apparatus of claim 75, wherein said mirror comprises a curved mirror.

77. The apparatus of claim 75, wherein said mirror comprises a plane mirror in combination with a lens which together effectively act as a curved mirror.

78. The apparatus of claim 74, wherein said real imaging is accomplished by a transmissive lens, at least one center curved mirror, and said mirror.

79. The apparatus of claim 78, wherein said mirror comprises a curved mirror.

80. The apparatus of claim 78, wherein said mirror comprises a plane mirror in combination with a lens which together effectively act as a curved mirror.

81. The apparatus of 68, wherein said apparent mirror is formed with achromatic optics.

82. The apparatus of 68, wherein said apparent mirror is formed with a plurality of optical elements, wherein at least one optical element of said plurality of optical elements comprises a distributed mirror whose effective reflective surface depth is a function of wavelength.

83. The apparatus of 82, wherein the wavelength dependence of said effective reflective surface depth compensates for chromatic dispersion of said plurality of optical elements so that the net chromatic aberrations of said apparent mirror is reduced.

84. The apparatus of claim 68, wherein said imaging is virtual imaging, wherein said virtual imaging is accomplished by a lens and a curved said mirror.

85. The method of claim 2, wherein said wave kind comprises light waves.

86. The method of claim 2, wherein said wave kind comprises matter waves.

87. The apparatus of claim 43, wherein said beam comprises a wave kind comprising matter waves.

* * * * *